(12) United States Patent
Lundby

(10) Patent No.: US 8,489,128 B2
(45) Date of Patent: Jul. 16, 2013

(54) EFFICIENT TRANSMISSION ON A SHARED DATA CHANNEL FOR WIRELESS COMMUNICATION

(75) Inventor: Stein A. Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 11/553,446

(22) Filed: Oct. 26, 2006

(65) Prior Publication Data

US 2007/0177569 A1 Aug. 2, 2007

Related U.S. Application Data

(60) Provisional application No. 60/732,418, filed on Oct. 31, 2005.

(51) Int. Cl.
*H04W 4/00* (2009.01)

(52) U.S. Cl.
USPC ............. 455/466; 455/464; 455/7; 370/349

(58) Field of Classification Search
USPC ............. 370/342, 442, 335, 441, 320, 328, 370/329, 349, 236; 445/522, 67, 450, 69, 445/436, 466, 463, 7, 464; 375/147, 148, 375/346, 267
See application file for complete search history.

(56) References Cited

U.S. PATENT DOCUMENTS

| | | | |
|---|---|---|---|
| 5,883,885 A | 3/1999 | Raith | |
| 6,002,942 A | 12/1999 | Park | |
| 6,064,662 A | 5/2000 | Gitlin et al. | |
| 6,195,680 B1 * | 2/2001 | Goldszmidt et al. | 709/203 |
| 6,621,796 B1 | 9/2003 | Miklos | |
| 6,904,100 B1 | 6/2005 | Romaniuk | |

(Continued)

FOREIGN PATENT DOCUMENTS

| | | |
|---|---|---|
| CN | 1476267 A | 2/2004 |
| EP | 1339188 | 8/2003 |

(Continued)

OTHER PUBLICATIONS

3GPP TS 25.212 v7.1.0; "3rd Generation Partnership Project; Technial Specification Group Radio Access Network; Multiplexing and channel coding (FDD)," 3GPP TS 25.212 version 7.1.0, Release 7 (Jun. 2006).

(Continued)

*Primary Examiner* — Mahendra Patel
(74) *Attorney, Agent, or Firm* — Michael J. DeHaemer

(57) ABSTRACT

Techniques for efficient data transmission and reception in a wireless communication system are described. In an aspect, a Node B sends transmissions on a shared data channel to a user equipment (UE) based on at least one parameter assigned to the UE prior to the transmissions. The Node B sends no signaling for the transmissions sent to the UE on the shared data channel. The UE processes the transmissions received from the shared data channel based on the assigned parameter(s). In another aspect, a Node B may send transmissions to a UE in time intervals assigned to the UE. In yet another aspect, a Node B may send transmissions to a UE based on assigned or non-assigned parameters. The Node B sends signaling whenever transmissions are sent with non-assigned parameters. The UE may process a transmission based on parameters obtained from received signaling or the assigned parameters.

53 Claims, 14 Drawing Sheets

U.S. PATENT DOCUMENTS

| | | |
|---|---|---|
| 7,400,607 B2 * | 7/2008 | Kim et al. .................... 370/335 |
| 7,808,955 B2 | 10/2010 | Dottling et al. |
| 2002/0057687 A1 | 5/2002 | Birkenmaier et al. |
| 2002/0071407 A1 | 6/2002 | Koo et al. |
| 2002/0093937 A1 * | 7/2002 | Kim et al. .................... 370/349 |
| 2003/0016770 A1 * | 1/2003 | Trans et al. .................. 375/346 |
| 2003/0026274 A1 * | 2/2003 | Droz ............................ 370/410 |
| 2003/0035403 A1 * | 2/2003 | Choi et al. .................... 370/342 |
| 2003/0108013 A1 | 6/2003 | Hwang et al. |
| 2003/0123470 A1 | 7/2003 | Kim et al. |
| 2003/0174675 A1 * | 9/2003 | Willenegger et al. ......... 370/335 |
| 2003/0192003 A1 * | 10/2003 | Das et al. .................... 714/758 |
| 2003/0225735 A1 * | 12/2003 | Weber ............................. 707/1 |
| 2004/0037224 A1 | 2/2004 | Choi et al. |
| 2004/0192308 A1 * | 9/2004 | Lee et al. ...................... 455/436 |
| 2004/0202147 A1 | 10/2004 | Hakkinen et al. |
| 2005/0022098 A1 * | 1/2005 | Vayanos et al. ............... 714/776 |
| 2005/0031050 A1 | 2/2005 | Kim et al. |
| 2005/0047393 A1 * | 3/2005 | Liu ............................... 370/352 |
| 2005/0068963 A1 | 3/2005 | Lee et al. |
| 2005/0074010 A1 | 4/2005 | Kim et al. |
| 2005/0157876 A1 * | 7/2005 | Jeong et al. .................... 380/200 |
| 2005/0163076 A1 * | 7/2005 | Vannithamby et al. ....... 370/329 |
| 2005/0169205 A1 * | 8/2005 | Grilli et al. .................... 370/313 |
| 2005/0276249 A1 | 12/2005 | Damnjanovic et al. |
| 2006/0034240 A1 | 2/2006 | Kwak et al. |
| 2006/0104242 A1 | 5/2006 | Kim et al. |
| 2006/0121920 A1 * | 6/2006 | Lundby ......................... 455/466 |
| 2006/0195576 A1 | 8/2006 | Rinne et al. |
| 2006/0227789 A1 * | 10/2006 | Dottling et al. .......... 370/395.21 |
| 2007/0036067 A1 | 2/2007 | Zhang et al. |
| 2007/0275728 A1 * | 11/2007 | Lohr et al. .................... 455/450 |
| 2008/0056229 A1 | 3/2008 | Gholmieh et al. |
| 2008/0123585 A1 * | 5/2008 | Granzow et al. .............. 370/320 |

FOREIGN PATENT DOCUMENTS

| | | |
|---|---|---|
| EP | 1475973 A1 | 11/2004 |
| GB | 2395404 | 5/2004 |
| JP | 2002536873 T | 10/2002 |
| KR | 1020040027965 | 4/2004 |
| KR | 1020060049184 | 5/2006 |
| RU | 2196392 C2 | 1/2003 |
| WO | WO9735449 A2 | 9/1997 |
| WO | 0045543 | 8/2000 |
| WO | 0045544 | 8/2000 |
| WO | 03003617 | 1/2003 |
| WO | WO03019795 A2 | 3/2003 |
| WO | 2005041469 | 5/2005 |
| WO | WO2005125109 | 12/2005 |

OTHER PUBLICATIONS

Lucent Technologies, "Asynchronous and Adaptive Incremental Redundancy (A2IR) Proposal for HSDPA," TSG-RAN#17(00)1382, Nov. 25, 2000, XP002190696.

Qualcomm CDMA Technologies, "HSDPA for Improved Downlink Data Transfer," Oct. 2004, pp. 1-17, Qualcomm Incorporated, San Diego, CA, USA, XP002427235.

Qualcomm Europe, "HS-SCCH-less HS-PDSCH Operation for Improved Support of IMS Real-Time Services," R1-051511, 3GPP TSG-RAN WG1 #43, Nov. 11, 2005, XP002467442.

Qualcomm Europe, "Reduced Complexity HS-SCCH-less Operation R1-062025," 3GPP TSG-RAN WG1 #46, Sep. 1, 2006, XP002467441.

Das, et al.: "Adaptive, Asynchronous Incremental Redundancy (A<2>IR) with Fixed Transmission Time Intervals (TTI) for HSDPA", PIMRC 2002, 13th IEEE International Symposium, pp. 1083-1087, Sep. 15-18, 2002.

Lee, et al.: "TFC Selection for MAC Scheduling in WCDMA," Vehicular Technology Conference, IEEE. pp. 2328-2332, XP010702199, Oct. 6, 2003.

Nanda, et al.: "Adaptation Techniques in Wireless Packet Data Services," IEEE Communications Magazine, IEEE Service Center, Piscataway, US, vol. 38, No. 1, pp. 54-64, XP011091213 (Jan. 2000).

International Search Report—PCT/US06/060411, International Search Authority—European Patent Office—Jun. 29, 2007.

Written Opinion—PCT/US06/060411, International Search Authority—European Patent Office—Jun. 29, 2007.

International Preliminary Report on Patentability—PCT/US2006/060411, Internatoinal Bureau of WIPO—Geneva Switzerland—May 6, 2008.

Sjoberg, et al.: "Real-Time Transport Protocol (RTP_Payload Format and File Storage Format for the Adaptive Multi-Rate (AMR) and Adaptive Multi-Rate Wideband (AMR-WB) Audio Codecs," Network Working Group RFC 3267; Jun. 2002.

3GPP TR 25.848 v4.0.0; "3rd Generation Partnership Project; Technical Specification Group Radio Access Network; Physical layer aspects of UTRA High Speed Downlink Packet Access," 3GPP TR 25.848 version 4.0.0 Release 4, Mar. 2001.

3GPP TSG-RAN Meeting#27 RP-050106; "Support of RT Services over HSDPA-HSDPA Mobility Enhancement," Source: Cingular Wireless, Tokyo, Japan, Mar. 9-11, 2005.

3GPP TSG-RAN Meeting#27 RP-050107; "HSDPA Mobility Enhancement Solution to Support Real-Time Delay Sensitive Services." Source: Cingular Wireless, Lucent Technologies, Tokyo, Japan, Mar. 9-11, 2005.

3GPP TSG-RAN WG1 Meeting#42 R1-050754; "Uplink DPCCH Gating." Source: Nokia, London, UK, Aug. 29-Sep. 2, 2005.

3GPP TSG-Ran WG1 #42 R1-050939; "E-DPCCH Enhancement for VoIP," Source: Lucent Technologies, London, UK, Aug. 29-Sep. 2, 2005.

3GPP TSG-RAN WG1 #42bis R1-051125; "Framework for Enhanced Continuous PS Connectivity." Source: QUALCOMM Europe, San Diego, CA, USA, Oct. 10-14, 2005.

3GPP2 C.S0001-D, "Introduction to cdma2000 Spread Spectrum Systems," IS 2000 version 1.0 Revision D, Feb. 2004 (1 of 6).

3GPP2 C.S0001-D, "Introduction to cdma2000 Spread Spectrum Systems," IS 2000 version 1.0 Revision D, Feb. 2004 (2 of 6).

3GPP2 C.S0001-D, "Introduction to cdma2000 Spread Spectrum Systems," IS 2000 version 1.0 Revision D, Feb. 2004 (3 of 6).

3GPP2 C.S0001-D, "Introduction to cdma2000 Spread Spectrum Systems," IS 2000 version 1.0 Revision D, Feb. 2004 (4 of 6).

3GPP2 C.S0001-D, "Introduction to cdma2000 Spread Spectrum Systems," IS 2000 version 1.0 Revision D, Feb. 2004 (5 of 6).

3GPP2 C.S0001-D, "Introduction to cdma2000 Spread Spectrum Systems," IS 2000 version 1.0 Revision D, Feb. 2004 (6 of 6).

3GPP2 C.S0024; "cdma2000 High Rate Packet Data Air Interface Specification," 3GPP2 C.S0024 version 2.0, IS-856, Oct. 27, 2000.

3GPP RAN1#42bis R1-051131; "Framework for Enhanced Continuous PS Connectivity," Source: QUALCOMM Europe.

TIA-95-B; "Mobile Station—Base Station Compatibility Standard for Wideband Spread Spectrum Cellular Systems," Sep. 2004.

Bender P et al., CDMA/HDR: a bandwidth efficient high speed wireless data service for nomadic users, Communication Magazine, the US., IEEE, Jul. 2000, vol. 38, pp. 70-77.

Qualcomm Europe, "Further details on HS-SCCH-less operation for VoIP traffic", 3GPP TSG-RAN WG2 meeting #51 R2-060550, Feb. 13, URL,http://www.3gpp.org/ftp/tsg_ran/WG2_RL2/TSGR2_51/Documents/R2-060550.zip.

* cited by examiner

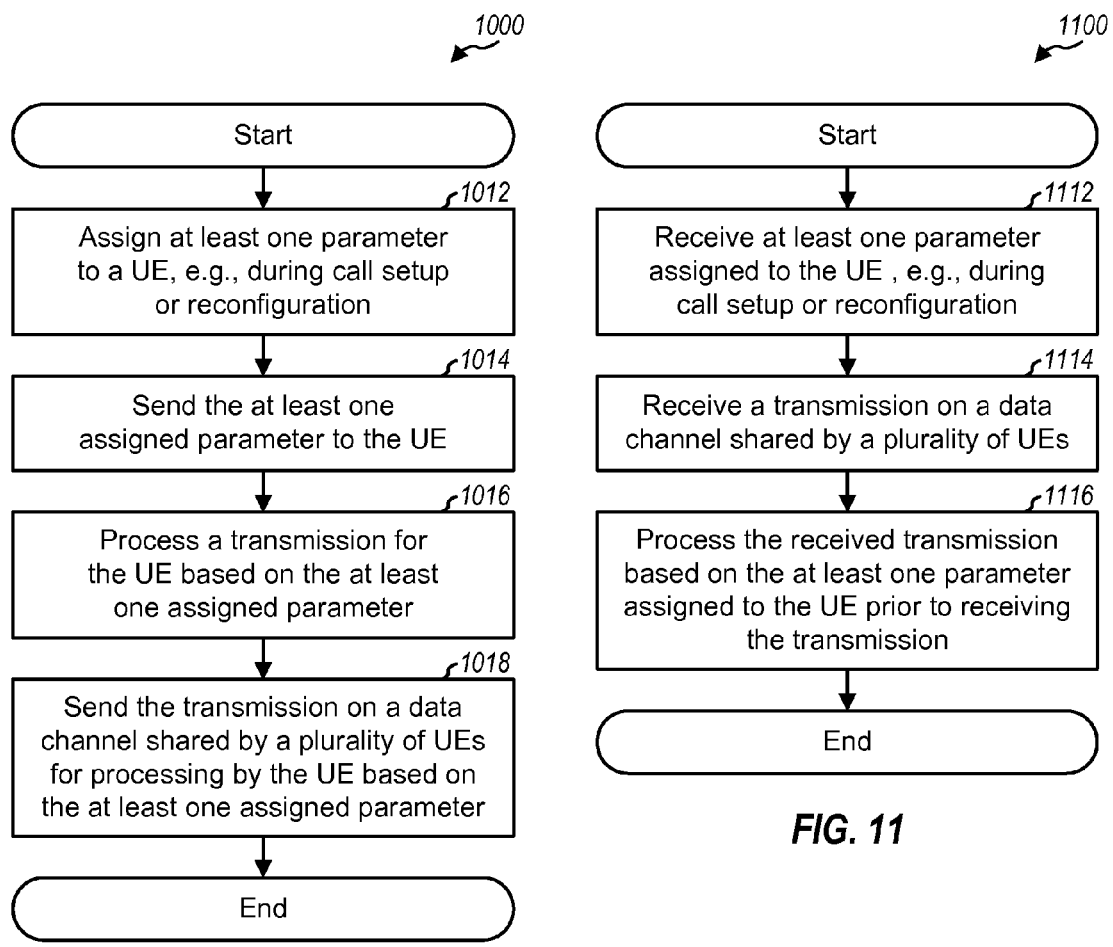

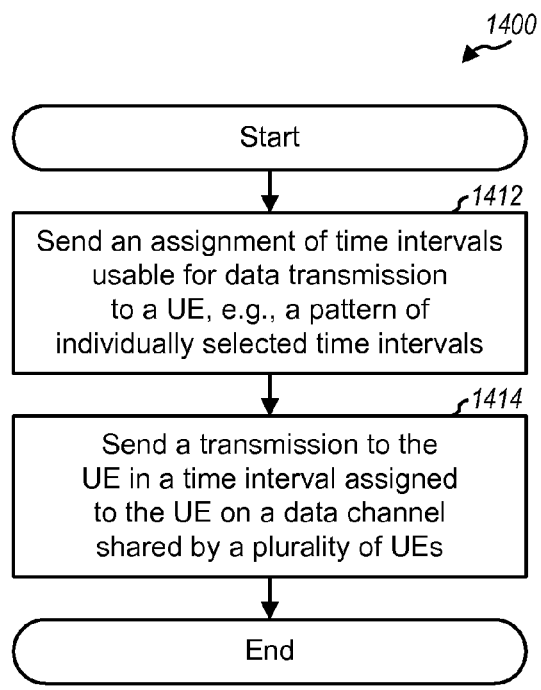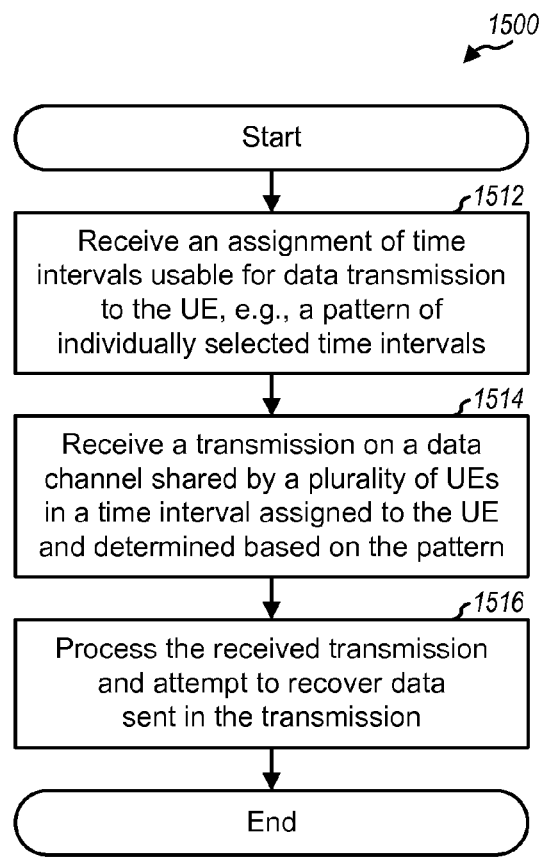
FIG. 14
FIG. 15

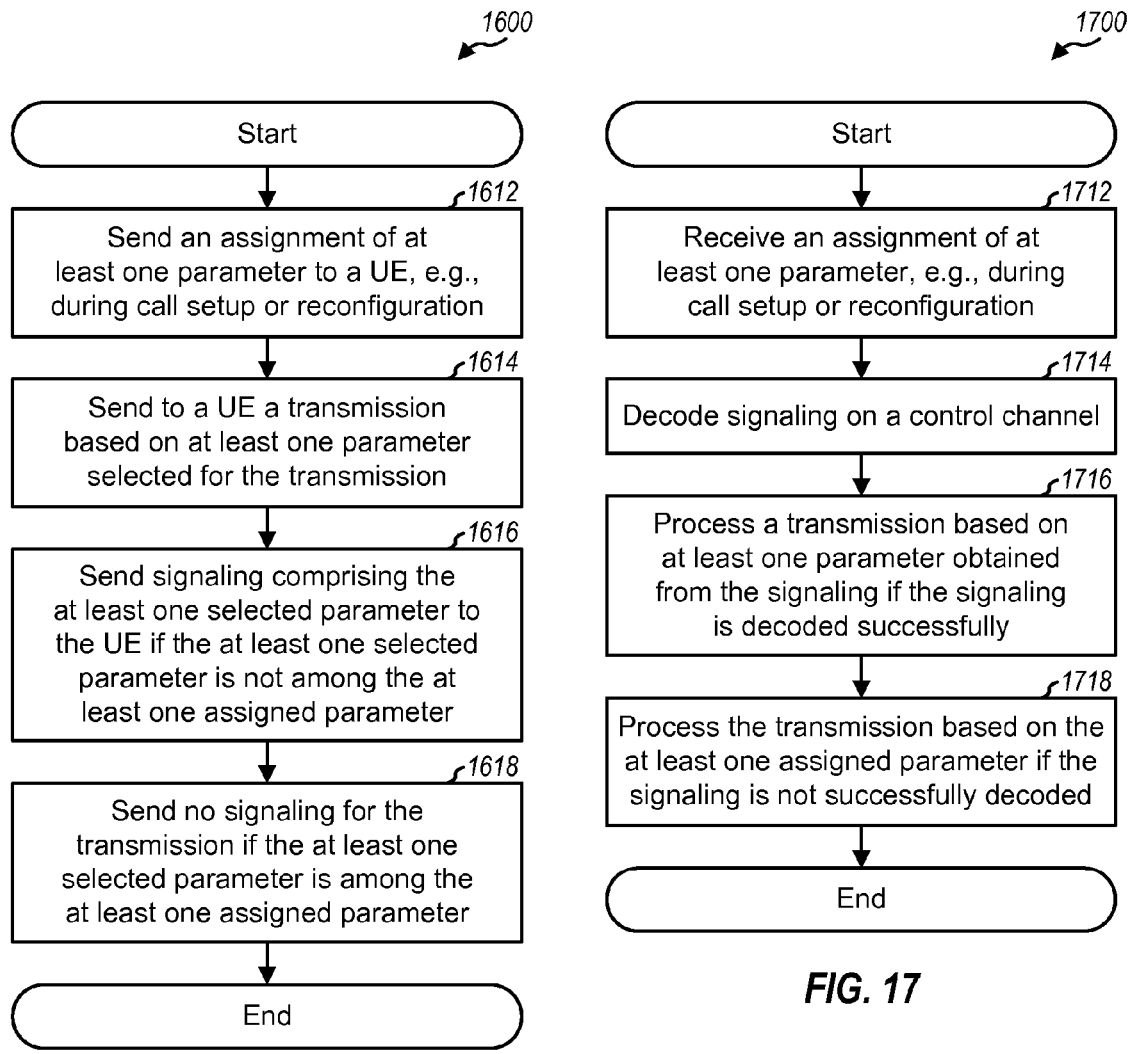

EFFICIENT TRANSMISSION ON A SHARED DATA CHANNEL FOR WIRELESS COMMUNICATION

CLAIM OF PRIORITY UNDER 35 U.S.C. §119

The present Application for Patent claims priority to Provisional Application Ser. No. 60/732,418, entitled "HSDPA ENHANCEMENTS FOR REAL-TIME SERVICES," filed Oct. 31, 2005, assigned to the assignee hereof, and expressly incorporated herein by reference.

BACKGROUND

I. Field

The present disclosure relates generally to communication, and more specifically to techniques for transmitting data in a wireless communication system.

II. Background

A wireless multiple-access communication system may include many Node Bs (or base stations) that support communication for many user equipments (UEs). A Node B may communicate with multiple UEs on the downlink and uplink. The downlink (or forward link) refers to the communication link from the Node Bs to the UEs, and the uplink (or reverse link) refers to the communication link from the UEs to the Node Bs.

On the downlink, a Node B may transmit data to multiple UEs using dedicated data channels and/or a shared data channel. A dedicated data channel is a data channel that is assigned to a specific UE and is used to send data only to that UE. A shared data channel is a data channel that is shared by multiple UEs and can carry data for one or more UEs at any given moment. A data channel is a mechanism for sending data and may be dependent on the radio technology used by the system. For example, in a Code Division Multiple Access (CDMA) system, a data channel may be associated with a specific channelization code, e.g., a specific Walsh code.

A Node B may use a shared data channel to achieve various benefits. The shared data channel may allow for better utilization of the available radio resources since each UE may be served as needed and using just enough radio resources to serve that UE. The shared data channel may also support higher peak data rates for the UEs since all radio resources available for the shared data channel may potentially be used for one UE. The shared data channel may also provide flexibility in scheduling the UEs for data transmission on the downlink.

A Node B may send signaling on a shared control channel in parallel with the shared data channel to convey how the shared data channel is used. For example, the signaling may convey which UE(s) are being served, the radio resources allocated to each UE being served, how data is sent to each UE, etc. Because of the dynamic nature of the shared data channel, the UEs that can potentially receive data on the shared data channel may continuously monitor the shared control channel in order to determine whether data is being sent for them. Each UE that receives signaling on the shared control channel may process the shared data channel based on the received signaling to recover the data sent to the UE. The shared control channel represents overhead for the shared data channel.

SUMMARY

Techniques for efficient data transmission and reception in a wireless communication system are described herein.

According to an aspect, a UE receives a transmission on a data channel shared by a plurality of UEs. The UE processes the received transmission based on at least one parameter assigned to the UE prior to receiving the transmission.

According to another aspect, a UE receives a transmission on a data channel shared by a plurality of UEs in a time interval assigned to the UE. The time interval is determined based on a pattern of individually selected time intervals that are usable for data transmission to the UE. The UE processes the received transmission.

According to yet another aspect, a UE decodes signaling on a control channel. The UE processes a received transmission based on at least one parameter obtained from the signaling if the signaling is decoded successfully. The UE processes the received transmission based on at least one parameter assigned to the UE if the signaling is not successfully decoded.

BRIEF DESCRIPTION OF THE DRAWINGS

FIG. 10 shows a process for data transmission without signaling.
FIG. 11 shows a process for data reception without signaling.
FIG. 14 shows a process for data transmission with assigned time intervals.
FIG. 15 shows a process for data reception with assigned time intervals.
FIG. 16 shows a process for data transmission with and without signaling.
FIG. 17 shows a process for data reception with and without signaling.

DETAILED DESCRIPTION

Figure 1:
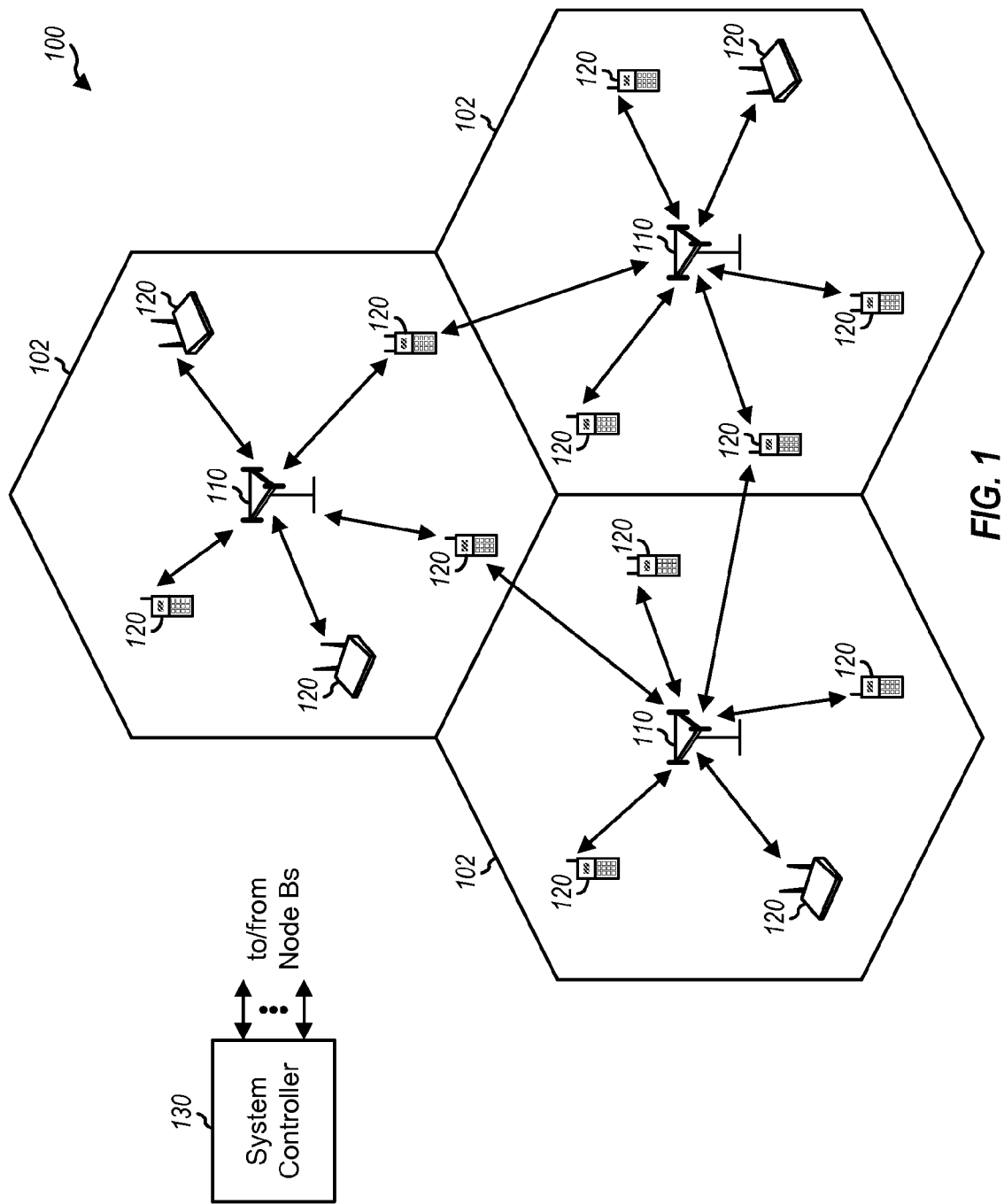
FIG. 1 shows a wireless communication system.

FIG. 1 shows a wireless communication system 100 with multiple Node Bs 110 and multiple UEs 120. A Node B is generally a fixed station that communicates with the UEs and may also be referred to as a base station, an enhanced Node B (eNode B), an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities. For example, system controller 130 may comprise a Radio Network Controller (RNC), a Mobile Switching Center (MSC), etc.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, and so on. A UE may actively communicate with a Node B or may only receive pilot and signaling from the Node B. The terms "UE" and "user" are used interchangeably herein.

Figure 2:
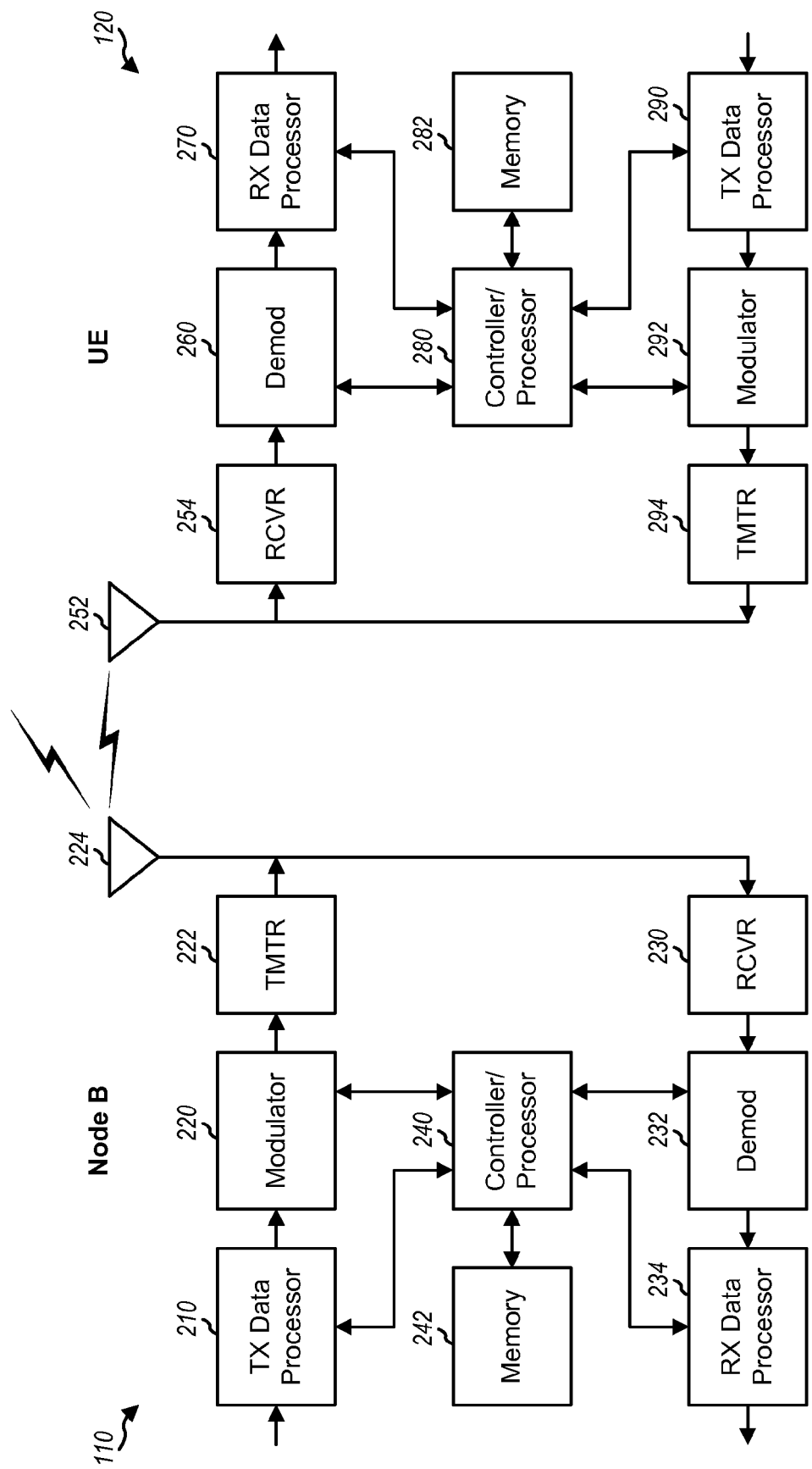
FIG. 2 shows a block diagram of a Node B and a UE.

FIG. 2 shows a block diagram of a Node B 110 and a UE 120, which are one of the Node Bs and one of the UEs in FIG. 1. At Node B 110, a transmit (TX) data processor 210 receives traffic data from a data source (not shown) and signaling from a controller/processor 240, processes (e.g., formats, encodes, interleaves, and symbol maps) the traffic data and signaling, and provides data symbols and signaling symbols. A modulator 220 processes the data and signaling symbols as specified by the system and provides output chips. A transmitter (TMTR) 222 processes (e.g., converts to analog, amplifies, filters, and frequency upconverts) the output chips and generates a downlink signal, which is transmitted from an antenna 224.

At UE 120, an antenna 252 receives the downlink signal from Node B 110 and provides a received signal to a receiver (RCVR) 254. Receiver 254 conditions (e.g., filters, amplifies, frequency downconverts, and digitizes) the received signal and provides received samples. A demodulator (Demod) 260 processes the received samples in a manner complementary to the processing by modulator 220 and provides symbol estimates. A receive (RX) data processor 270 processes (e.g., symbol demaps, deinterleaves, and decodes) the symbol estimates and provides decoded data for UE 110.

On the uplink, at UE 120, data and signaling are processed by a TX data processor 290, modulated by a modulator 292, conditioned by a transmitter 294, and transmitted via antenna 252. At Node B 110, the uplink signals from UE 120 and other UEs are received by antenna 224, conditioned by a receiver 230, demodulated by a demodulator 232, and processed by an RX data processor 234 to recover data and signaling sent by the UEs. In general, the processing for uplink transmission may be similar to, or different from, the processing for downlink transmission.

Controllers 240 and 280 direct the operations at Node B 110 and UE 120, respectively. Memories 242 and 282 store data and program codes for Node B 110 and UE 120, respectively.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, etc. The terms "system" and "network" are often used interchangeably. A CDMA system may utilize a radio technology such as Wideband-CDMA (W-CDMA), cdma2000, etc. cdma2000 covers IS-2000, IS-856, and IS-95 standards. A TDMA system may utilize a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are described below for downlink transmission in a W-CDMA system.

In W-CDMA, data for a UE is processed as one or more transport channels at a higher layer. The transport channels may carry data for one or more services, e.g., voice, video, packet data, gaming, etc. The transport channels are mapped to physical channels at a physical layer. The physical channels are channelized with different channelization codes and are orthogonal to one another in code domain.

3GPP Release 5 and later supports High-Speed Downlink Packet Access (HSDPA), which is a set of channels and procedures that enable high-speed packet data transmission on the downlink. For HSDPA, a Node B sends data on a High Speed Downlink Shared Channel (HS-DSCH), which is a downlink transport channel that is shared by all UEs in both time and code. The HS-DSCH may carry data for one or more UEs in a given transmission time interval (TTI). A TTI is equal to one subframe for HSDPA and is the smallest unit of time in which the UEs may be scheduled and served. The sharing of the HS-DSCH is dynamic and may change from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

For HSDPA, a Node B may use up to fifteen 16-chip channelization codes with spreading factor of 16 (SF=16) for the HS-PDSCH. The Node B may also use any number of 128-chip channelization codes with spreading factor of 128 (SF=128) for the HS-SCCH. The number of 16-chip channelization codes for the HS-PDSCH and the number of 128-chip channelization codes for the HS-SCCH are configurable. The channelization codes for the HS-PDSCH and HS-SCCH are orthogonal variable spreading factor (OVSF) codes that may be generated in a structured manner. The spreading factor (SF) is the length of a channelization code. A symbol is spread with a channelization code of length SF to generate SF chips for the symbol.

A UE may be assigned up to fifteen 16-chip channelization codes for the HS-PDSCH and up to four 128-chip channelization codes for the HS-SCCH. The channelization codes for the HS-SCCH are assigned to the UE at call setup and signaled to the UE via upper layer signaling. The channelization codes for the HS-PDSCH are assigned dynamically and conveyed to the UE via signaling sent on the HS-SCCH using one of the assigned 128-chip channelization codes.

HSDPA may also be considered as having (a) up to fifteen HS-PDSCHs, with each HS-PDSCH using a different 16-chip channelization code, and (b) any number of HS-SCCHs, with each HS-SCCH using a different 128-chip channelization code. In this case, a UE may be assigned up to four HS-SCCHs and up to fifteen HS-PDSCHs. In the following description, HSDPA is considered as having (a) a single HS-PDSCH with up to fifteen 16-chip channelization codes and (b) a single HS-SCCH with any number of 128-chip channelization codes. In the following description, references to channelization codes are for the HS-PDSCH unless noted otherwise.

Figure 3:
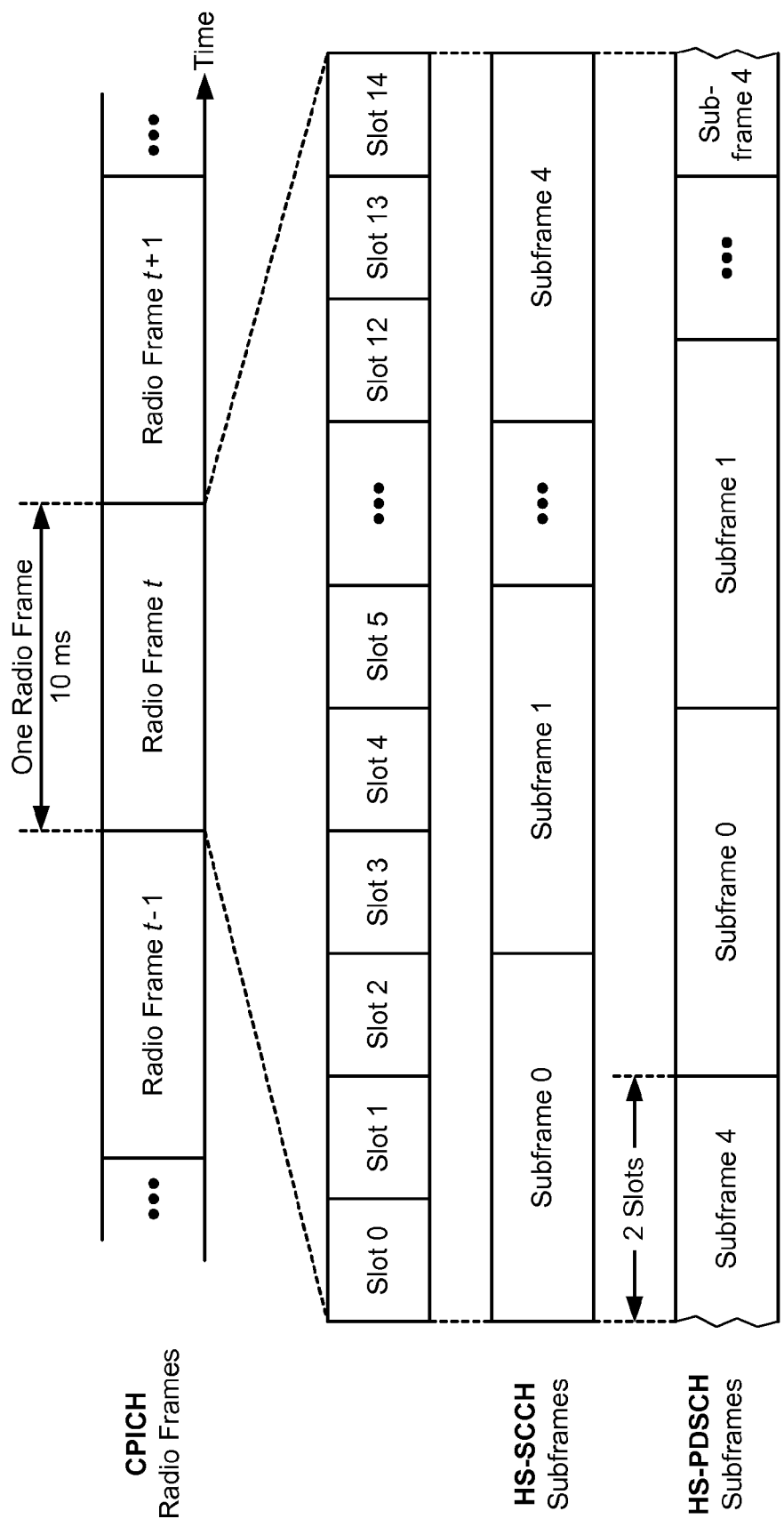
FIG. 3 shows a frame format in W-CDMA.

FIG. 3 shows a frame format in W-CDMA. The timeline for transmission is divided into radio frames. The radio frames on the downlink are defined relative to the timing of a Common Pilot Channel (CPICH). Each radio frame has a duration of 10 milliseconds (ms) and is identified by a 12-bit system frame number (SFN). Each radio frame is further partitioned into 15 slots, which are labeled as slot 0 through slot 14. Each slot has a duration of 0.667 ms and includes 2560 chips at 3.84 megachips/second (Mcps). Each radio frame is also partitioned into five subframes 0 through 4. Each subframe has a duration of 2 ms and spans 3 slots. The subframes of the HS-SCCH are time aligned with the radio frames of the CPICH. The subframes of the HS-PDSCH are shifted to the right (or delayed) by two slots relative to the subframes of the HS-SCCH.

The HS-DSCH carries transport blocks for the UEs being served. A transport block is a block of data and may also be referred to as a data block, a packet, etc. Each transport block is encoded and modulated and then sent on the HS-PDSCH.

HSDPA supports hybrid automatic retransmission (HARQ), which is also referred to as incremental redundancy (IR). With HARQ, a Node B sends a new transmission for a transport block and may send one or more retransmissions until the transport block is decoded correctly by a UE, or the maximum number of retransmissions has been sent, or some other termination condition is encountered. The Node B may thus send a variable number of transmissions for a transport block. The first transmission is referred to as a new transmission, and each subsequent transmission is referred to as a retransmission. HSDPA supports asynchronous IR, which means that a retransmission may be sent a variable amount of time after a prior transmission. In contrast, with synchronous IR, a retransmission is sent a fixed amount of time after a prior transmission. With both synchronous and asynchronous IR, there is a time gap between successive transmissions of a transport block. During this time gap, transmissions for other transport blocks may occur. Transmissions of different transport blocks may therefore be interleaved with HARQ.

For HARQ in HSDPA, a Node B generates a cyclic redundancy check (CRC) for a transport block, appends the CRC to the transport block, and encodes the transport block and CRC based on a coding scheme or code rate to obtain a coded block. The CRC is used by a UE to detect errors after decoding. The Node B partitions the coded block into multiple redundancy versions. Each redundancy version may contain different encoded information (or code bits) for the transport block. The Node B may send one redundancy version for each transmission of the transport block. In HSDPA, the Node B may select the sequence of redundancy versions to send for the transport block.

The Node B sends signaling on the HS-SCCH for each transmission sent on the HS-PDSCH. Table 2 gives the signaling sent on the HS-SCCH in HSDPA Release 5. The first column of Table 2 lists different fields or types of information included in the signaling, the second column gives the size of each field, and the third column gives a short description of what is conveyed by each field. The fourth column is described below.

TABLE 2

HS-SCCH Information

| HS-SCCH Field | Size (bits) | With HS-SCCH | Without HS-SCCH |
|---|---|---|---|
| Channelization code set | 7 | Indicate one of 120 possible channelization code sets for HS-PDSCH | One channelization code assigned to the UE prior to transmissions on HS-PDSCH |
| Modulation scheme | 1 | Indicate either QPSK or 16-QAM | Fixed at QPSK |
| Transport block size | 6 | Used to select one of 254 possible transport block sizes | Two transport block sizes assigned to the UE; blindly determined by the UE for each transmission |
| HARQ process number | 3 | Indicate which transport block is being sent | Not needed because synchronous IR is used |
| Redundancy version (RV) | 3 | Indicate redundancy version and modulation | Not needed because synchronous IR is used with a fixed sequence of redundancy versions |
| New data indicator | 1 | Indicate whether current transmission is a retransmission of a previously received transmission. | Not needed with synchronous IR and fixed sequence of redundancy versions |
| UE identity (UE ID) | 16 | Sent with signaling on HS-SCCH | Sent with data on HS-PDSCH |

The signaling on the HS-SCCH includes transport format and resource related information (TFRI) and HARQ-related information (or HARQ information). The TFRI includes the channelization code set, modulation scheme, and transport block size. The HARQ information includes the HARQ process number, redundancy version, and new data indicator. The signaling is processed in two parts. Part 1 contains 8 bits for the channelization code set and modulation scheme. Part 2 contains 13 bits for the transport block size and HARQ information. A CRC is calculated over both parts 1 and 2. Part 1 is encoded with a rate ½ convolutional code, scrambled with the UE ID, and sent in the first slot of a subframe. Part 2 and the CRC are encoded with a rate ½ convolutional code and sent in the last two slots of the subframe. This allows the UE to recover the time critical information of part 1 from the HS-SCCH prior to the data transmission on the HS-PDSCH.

Figure 4:
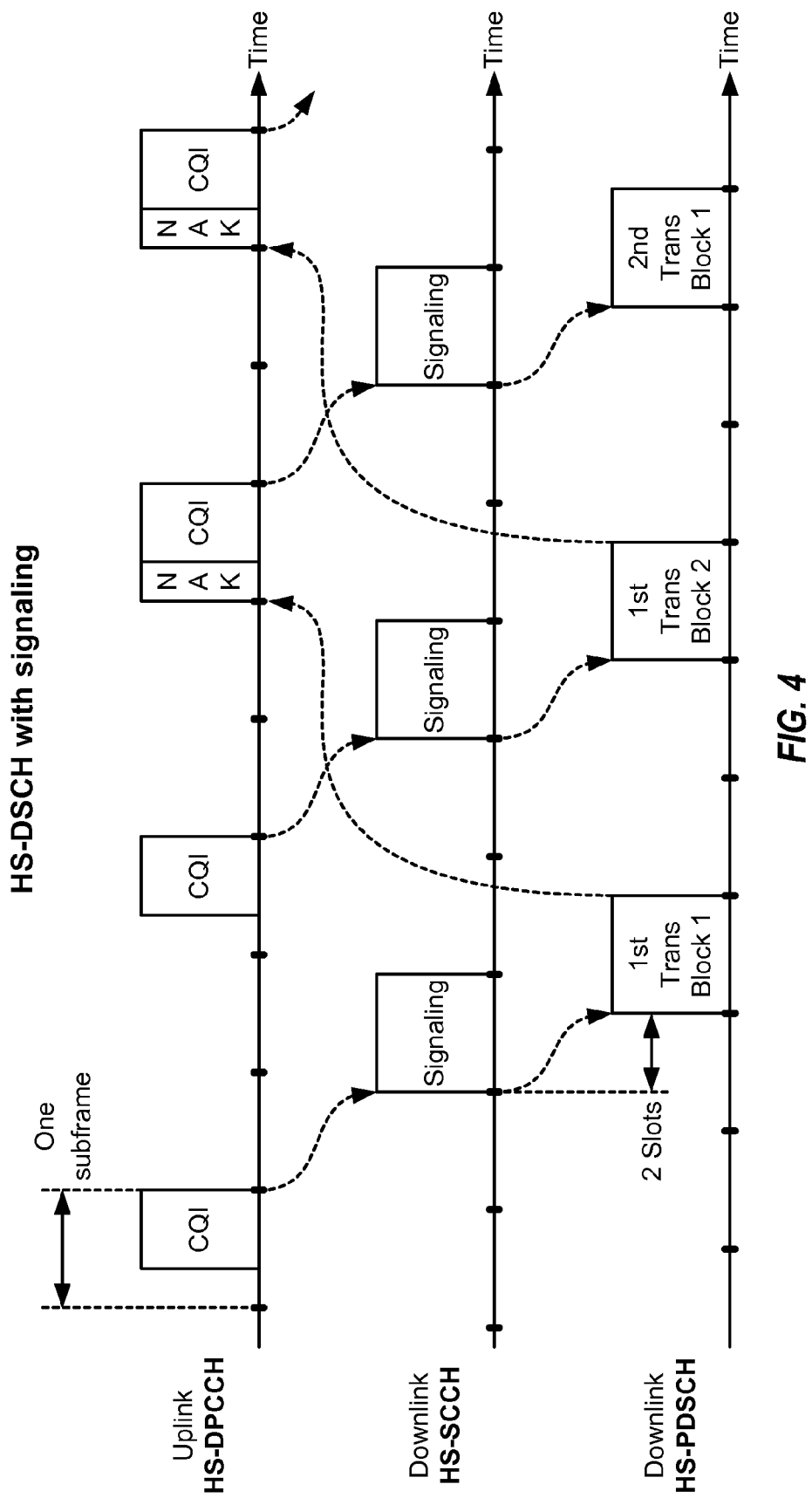
FIG. 4 shows transmissions for a UE with HARQ in HSDPA.

FIG. 4 shows data transmission on the HS-DSCH with signaling. A UE periodically estimates its received signal quality based on a pilot and sends a channel quality indicator (CQI) on the HS-DPCCH. A Node B has data to send to the UE and schedules the UE for downlink transmission. The Node B sends signaling for the UE on the HS-SCCH and sends a first transmission of a transport block for the UE on the HS-PDSCH. The data transmission on the HS-PDSCH is delayed by two slots from the corresponding signaling transmission on the HS-SCCH.

The UE processes the HS-SCCH and recovers the signaling sent to the UE. The UE then processes the HS-PDSCH based on the received signaling and recovers the transport block sent to the UE. The UE sends an acknowledgement (ACK) on the HS-DPCCH if the transport block is decoded correctly and sends a negative acknowledgement (NAK) otherwise. The UE also estimates the received signal quality and sends CQI along with the ACK or NAK on the HS-DPCCH. The feedback transmission on the HS-DPCCH is delayed by approximately 7.5 slots from the end of the corresponding data transmission on the HS-PDSCH.

The Node B may send a retransmission of the transport block if a NAK is received from the UE and may send a new transmission for another transport block if an ACK is received. The Node B sends signaling on the HS-SCCH and the retransmission or new transmission on the HS-PDSCH. The signaling indicates whether the HS-PDSCH carries a retransmission or a new transmission as well as other information. In general, the Node B may send a new transmission for a transport block and one or more retransmissions if necessary. The Node B may send multiple transport blocks in an interlaced manner, as shown in FIG. 4.

Figure 5:
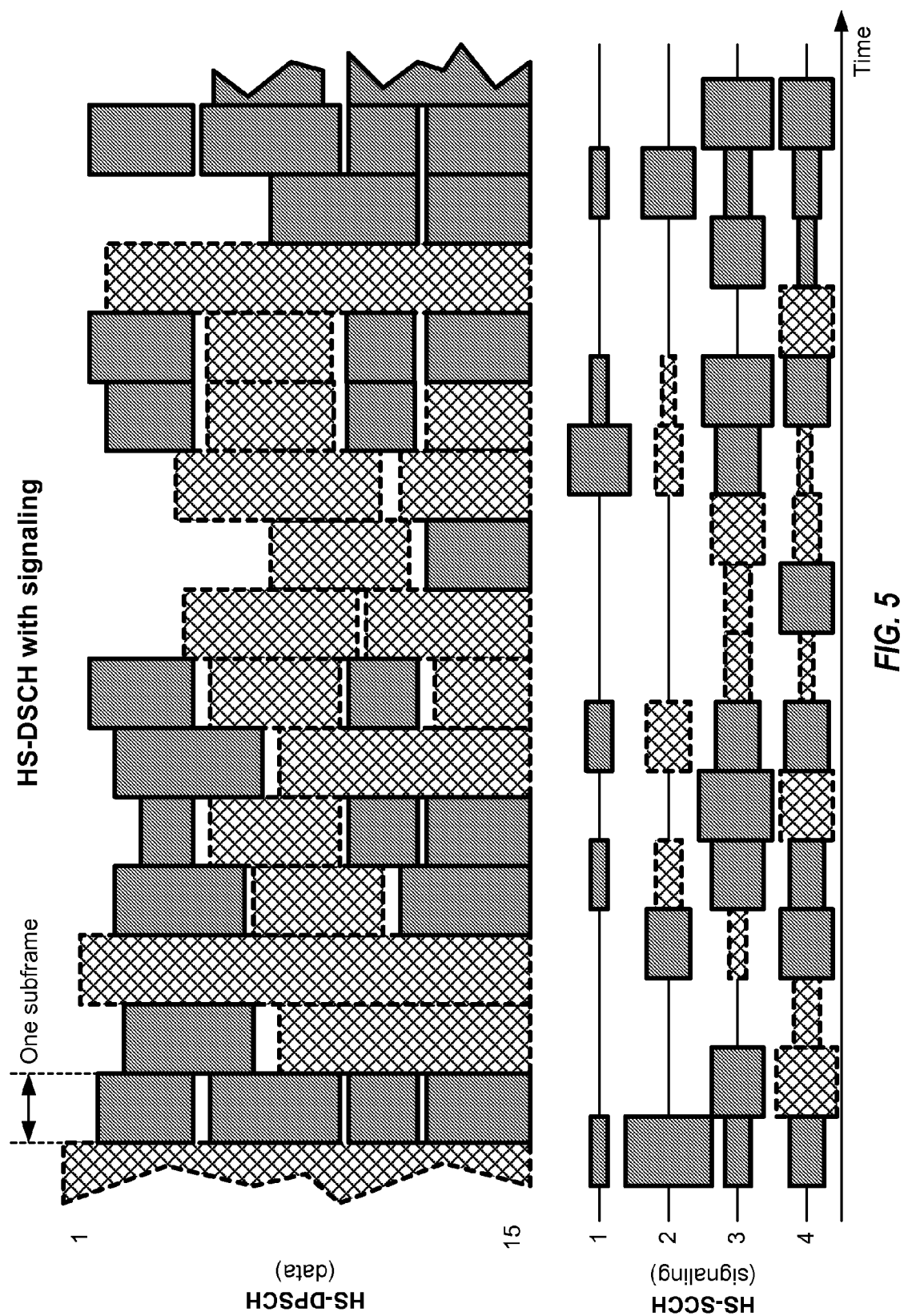
FIG. 5 shows transmissions for multiple UEs in HSDPA.

FIG. 5 shows data transmission to multiple UEs in HSDPA. A Node B schedules UEs for data transmission on the HS-PDSCH in each TTI. The Node B sends signaling for the scheduled UEs on the HS-SCCH and sends transmissions for the scheduled UEs on the HS-PDSCH. Each UE that might receive data processes the HS-SCCH to determine whether signaling has been sent to that UE. Each scheduled UE processes the HS-PDSCH to recover the transport block sent to the UE. Each scheduled UE sends ACK/NAK and CQI feedback on the HS-DPCCH. UEs that are not scheduled in a given TTI may also send ACK/NAK for a prior transmission and CQI for the current TTI on the HS-DPCCH.

In FIG. 5, transmissions on the HS-PDSCH and signaling on the HS-SCCH for real-time services such as Voice-over-Internet Protocol (VoIP), gaming, etc., are shown with solid shading. Transmissions on the HS-PDSCH and signaling on the HS-SCCH for other services such as best effort, etc., are shown with diagonal hashing. Each transmission on the HS-PDSCH is associated with corresponding signaling on the HS-SCCH.

HSDPA is designed and optimized for applications analogous to downloading large amounts of data. Many simulation results used in the design of HSDPA were generated based on a full-buffer traffic model. This premise leads to an HSDPA design that optimizes cell throughput rather than performance for delay sensitive applications, which may produce relatively small packets. Some of the consequences of the current HSDPA design are:

1. The HS-SCCH carries many bits for signaling, as shown in Table 2,
2. The HS-SCCH is encoded and transmitted in a sub-optimal manner,
3. The HS-PDSCH carries transport blocks that are relatively large for some real-time services, and
4. The HS-DPCCH is continuously transmitted by each UE.

The large amount of signaling on the HS-SCCH is used to support (a) flexible choice of assigned channelization codes for the HS-PDSCH, which can change on a transmission-by-transmission basis, (b) flexible choice of transport block size from 254 possible transport block sizes, (c) flexible choice of transmission and retransmission time for asynchronous IR, (d) flexible choice of redundancy version, and (e) flexible choice of modulation. All of these flexible features result in a large amount of overhead on the HS-SCCH.

Furthermore, the signaling on the HS-SCCH is split into two parts as described above to simplify UE implementation. The HS-PDSCH transmission is delayed relative to the HS-SCCH transmission, as shown in FIGS. 4 and 5, to also simplify UE implementation. Both of these characteristics are sub-optimal and cause the overhead due to the HS-SCCH to be even larger.

The HS-PDSCH can carry transport blocks of different sizes to better match the data payloads of the UEs. HSDPA supports 254 transport block sizes ranging from 137 bits to 27,952 bits. The transport block sizes are dependent on the modulation scheme (e.g., QPSK or 16 QAM) and the number of channelization codes used for transmission on the HS-PDSCH. Different sets of transport block sizes are available for different numbers of channelization codes. For example, 103 transport block sizes ranging from 137 to 1871 bits may be used when one channelization code is assigned for the HS-PDSCH.

The small transport block sizes may utilize too much channelization code space. Spreading factor of 16 is used for the HS-PDSCH because it reduces the amount of signaling to convey the assigned channelization code set while providing sufficient code space granularity for data. This choice of spreading factor results in small transport block sizes (which are seldom used for full-buffer traffic) having small effective code rates. For example, all transport block sizes from 137 to 449 bits with QPSK have a code rate of $\frac{1}{2}$ or less on the first transmission. For VoIP, a full-rate frame for 12.2 kilobits/second (kbps) adaptive multi-rate (AMR) speech contains 317 bits. A typical transport block size for this full-rate frame has a code rate of approximately $\frac{1}{3}$ on the first transmission. The excess capacity of this typical transport block size results in a low code rate for the first transmission, which may result in more radio resources being used for the full-rate frame than necessary.

Each UE that might receive data transmission on the HS-PDSCH continuously send feedback information (e.g., CQI) on the HS-DPCCH. The feedback information improves performance of data transmission on the downlink at the expense of uplink overhead and higher UE battery consumption. The flexible scheduling of UEs for data transmission on the HS-PDSCH requires the UEs to continuously monitor the HS-SCCH and continuously transmit on the HS-DPCCH.

For the reasons noted above, the HSDPA design in Release 5 and Release 6 provides good performance for applications resembling full-buffer traffic model but is inefficient for applications with low-throughput and/or delay-sensitive data. Furthermore, this HSDPA design does not consider issues related to continuous packet connectivity, such as uplink overhead and UE battery life.

1. Transmissions with Assigned Parameters

In an aspect, a Node B sends transmissions on a shared data channel (e.g., the HS-DSCH and HS-PDSCH) to a UE based on at least one parameter that is assigned to the UE prior to the transmissions. The Node B does not send signaling on a shared control channel (e.g., the HS-SCCH) for the transmissions sent to the UE on the shared data channel, which may greatly reduce overhead. The UE processes the transmissions received from the shared data channel based on the assigned parameters. A shared data channel may comprise channels at different layers (e.g., transport and physical channels) observed by a transport block or a data packet. As an example, for HSDPA, a shared data channel may comprise the HS-DSCH and HS-PDSCH. A shared data channel may comprise other channels for other radio technologies.

In general, any number of parameters and any type of parameter may be assigned to the UE. For example, the assigned parameters may include any one or any combination of the following:

1. Channelization code parameters,
2. Coding and modulation parameters,

3. HARQ or retransmission parameters, and
4. Transmission time parameters.

The channelization code parameters may indicate the number of channelization codes and/or the specific channelization codes usable for transmissions to the UE. The assigned channelization codes may be any of the 16-chip channelization codes available for the HS-PDSCH and/or other channelization codes. For example, the UE may be assigned a channelization code with spreading factor of 32 or 64, which may occupy less code space than one 16-chip channelization code. The UE may process the shared data channel for only the assigned channelization codes and may ignore other channelization codes.

The coding and modulation parameters may indicate how data is encoded and modulated. For example, the coding and modulation parameters may indicate one or more modulation schemes (e.g., QPSK and/or 16 QAM), one or more transport block sizes, one or more code rates, etc., usable for transmissions to the UE. The UE may process the shared data channel based on the assigned coding and modulation parameters.

The HARQ parameters may indicate parameters applicable for re/transmissions to the UE such as whether synchronous IR is used, the sequence of redundancy versions for a transport block, the number of retransmissions for a transport block, the minimum time interval between consecutive transmissions for a transport block, ACK/NAK feedback setting, etc. The redundancy versions for the transport block may be sent in a specific order that may be known a priori by the Node B and UE. For example, the first redundancy version may be sent in the first transmission for the transport block, the second redundancy version may be sent in the second transmission, the third redundancy version may be sent in the third transmission, etc. The ACK/NAK feedback setting may indicate whether to send both ACK and NAK feedback, only ACK feedback, etc. When no signaling is sent on the HS-SCCH, the UE may not be able to determine whether a decoding error results from (a) a transport block sent to the UE and decoded in error by the UE, (b) a transport block sent to another UE, or (c) no transport block sent to any UE. Therefore, UE may not know when to send NAKs for its transport blocks. By sending only ACK feedback, extraneous signaling for NAKs due to transport blocks sent to other UEs may be avoided.

The transmission time parameters may indicate time intervals or TTIs in which transmissions might be sent to the UE. For applications that send data periodically, the assigned time intervals may be determined based on periodicity of the data, e.g., every 10 or 20 ms for VoIP. The UE may process the shared data channel only during the assigned time intervals and may go to sleep during other time in order to conserve battery power.

The assigned parameters may also include other types of parameters, which may be dependent on the system design. For example, in an OFDM-based system, the assigned parameters may indicate one or more specific subcarriers that can be used for transmissions to the UE. In a system that supports multiple-input multiple-output (MIMO) transmission, the assigned parameters may indicate the number of data streams that can be sent to the UE, one or more precoding matrices that can be used for transmissions to the UE, etc.

The shared data channel may comprise transport and physical channels, e.g., the HS-DSCH and HS-PDSCH. Certain parameters (e.g., coding parameters) may be applicable for the transport channel portion of the shared data channel while other parameters (e.g., modulation and channelization code parameters) may be applicable for the physical channel portion of the shared data channel.

In an aspect, one or more transmission formats may be defined and assigned to a UE. Each transmission format may be associated with one or more specific parameters to use for transmission. For example, a transmission format may be associated with a specific set of one or more channelization codes, a specific modulation scheme, a specific code rate or transport block size, etc. A Node B may send a transmission based on one of the transmission format(s) assigned to the UE. If the UE is assigned multiple transmission formats, then the Node B may use any one of the transmission formats for each transmission sent to the UE.

In general, a parameter may be for anything pertinent for data transmission such as, e.g., block size, code rate, modulation scheme, HARQ parameter, time interval, etc. A transmission format may be associated with one or more specific parameters (e.g., a block size and a modulation scheme) and may be a convenient mechanism for conveying parameters.

In general, assigned parameters may be used for any shared data channel in any wireless communication system. Assigned parameters may be used for HSDPA in order to avoid sending signaling on the HS-SCCH. A new subframe format or transmission mode for the HS-DSCH may be defined with one or more of the following characteristics:
1. Signaling is not sent on the HS-SCCH,
2. One or more specific channelization codes are usable for transmissions to the UE,
3. One or more specific modulation schemes are usable for transmissions,
4. One or more specific transport block sizes are usable for transmissions,
5. HARQ is set to synchronous IR with a predetermined number of retransmissions and a predetermined sequence of redundancy versions, and
6. A UE-specific CRC is used for each transport block send on the HS-PDSCH.

Some of the parameters may be fixed while other parameters may be configurable. In an aspect, the channelization codes and transport block sizes are configurable parameters, and other parameters are fixed. For example, the modulation scheme may be fixed at QPSK, the number of retransmissions may be fixed at two, the sequence of redundancy versions may be fixed, etc. The fixed parameters are known a priori by the Node B and UE. The configurable parameters may be determined at the start of a call and may be changed during the call.

One or more transmission formats may be defined for a UE. For example, a transmission format may be defined with the following:
1. A specific channelization code for the HS-PDSCH,
2. A specific modulation scheme (e.g., QPSK),
3. A specific transport block size,
4. HARQ set to synchronous IR, with two retransmissions and a predetermined sequence of redundancy versions, and
5. A UE-specific CRC.

Multiple transmission formats with different parameters may be defined for the UE. For example, two transmission formats may be defined for two different transport block sizes and the same channelization code, modulation scheme, etc. In general, a transmission format may be associated with any number of parameters and any type of parameter.

The parameters that are conveyed via signaling on the HS-SCCH may thus be fixed or configured/assigned prior to transmissions. In one design, all of the parameters conveyed via signaling on the HS-SCCH may be handled as shown in the last column of Table 2. In this design, all of the parameters are either fixed or configured/assigned so that signaling on the HS-SCCH is not needed. In this design, a single channelization code and two transport block sizes are usable for transmissions to the UE. The two transport block sizes may be selected based on data requirements for a call. As an example, for a VoIP call, a transport block size of 353 bits may be used for a 12.2 Kbps AMR-NB speech frame or a 12.6 Kbps AMR-WB speech frame. A transport block size of 161 bits may be used for an AMR-NB or AMR-WB silence descriptor (SID) frame. Other transport block sizes and/or different numbers of transport block sizes may also be used.

In an aspect, a UE may be assigned one or multiple channelization codes among the channelization codes available for the HS-PDSCH. In another aspect, a UE may be assigned a channelization code with spreading factor larger than 16. The UE may then despread a received transmission with a channelization code that is longer than the shortest channelization code for the shared data channel. The larger spreading factor reduces granularity in code space assignment and may improve channelization code utilization. For example, a UE with small data payload sizes (e.g., for VoIP or gaming) may be assigned a channelization code with spreading factor of 32 and may then occupy half of the code space. A transmission sent with this SF=32 channelization code may have a code rate that is two times higher than a comparable transmission sent with an SF=16 channelization code. HARQ can compensate for the higher code rate by sending retransmissions for transport blocks requiring lower code rates. In yet another aspect, a UE is assigned a time varying channelization code (which may vary over time in a predetermined manner) or different channelization codes in different time intervals.

The assigned parameters for a UE may be given by one or more transmission formats and/or in some other manner. The assigned parameters may be determined for the UE during call setup at the start of a call and may be based on requirements of the call. For example, the assigned transport block sizes may be selected based on data requirements, the assigned time intervals may be selected based on call type (e.g., VoIP or gaming), etc. The assigned parameters may also be modified during the call due to various reasons such as changes in data requirements, system loading, etc. Changes to the assigned parameters may be handled via reconfiguration mechanisms supported by the system. The assigned parameters may thus be static or semi-static and may be configurable for each UE. The assigned parameters may be sent to each UE via upper layer signaling or by some other means prior to transmissions on the shared data channel using the assigned parameters. For example, the assigned parameters may be sent at call setup using Layer 3 Radio Bearer Setup messages in W-CDMA or during reconfiguration using Radio Bearer Reconfiguration messages.

Figure 6:
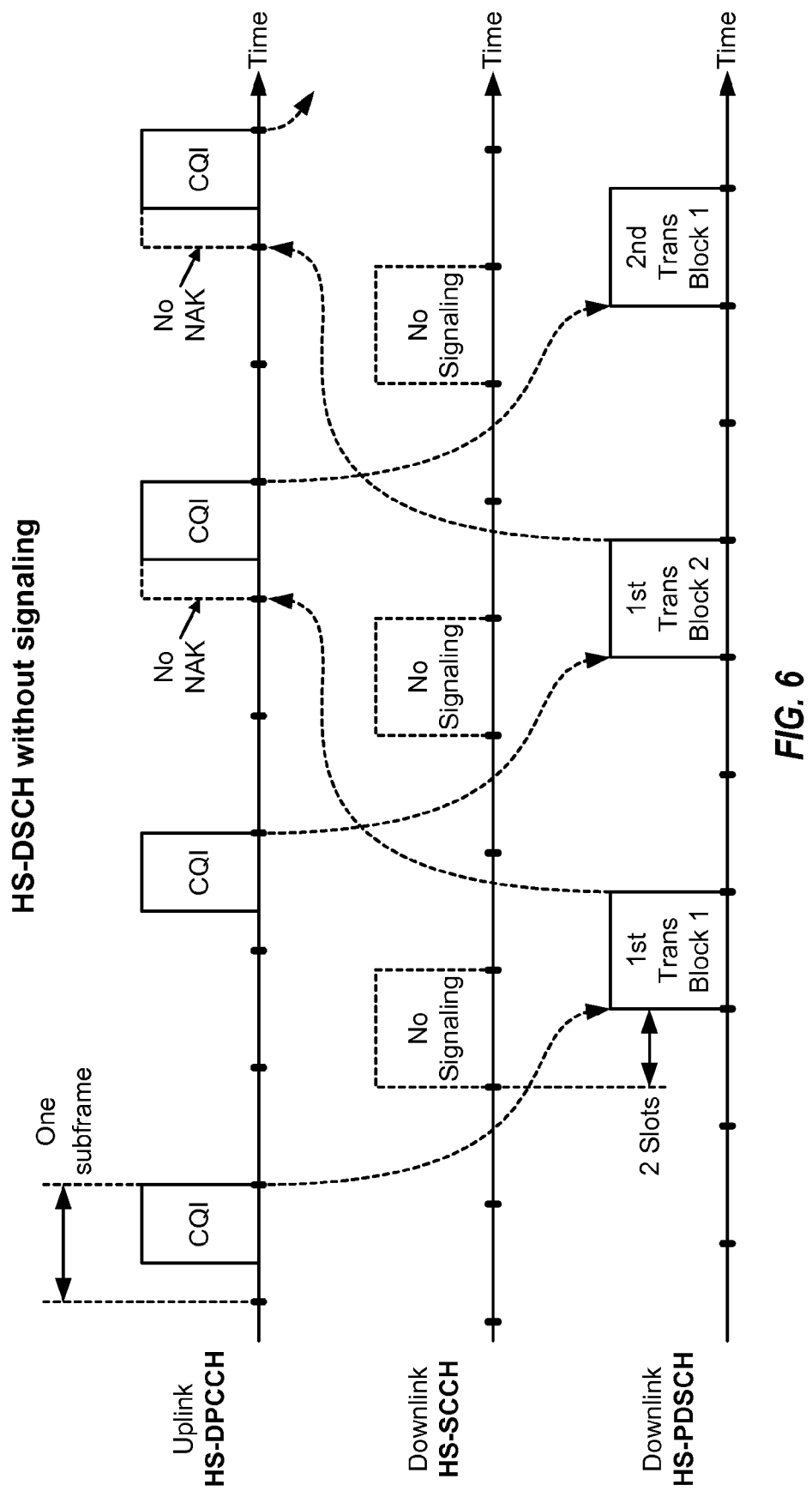
FIG. 6 shows transmissions for a UE with assigned parameters.

FIG. 6 shows data transmission on the HS-DSCH with assigned parameters. A UE periodically estimates its received signal quality and sends CQI on the HS-DPCCH. A Node B has data to send to the UE and schedules the UE for downlink transmission. The Node B processes a transport block based on the assigned parameters, e.g., an assigned transmission format. The Node B sends no signaling on the HS-SCCH and sends a first transmission of the transport block on the HS-PDSCH to the UE. The UE processes the HS-PDSCH based on the assigned parameters and recovers the transport block sent to the UE. The UE sends an ACK on the HS-DPCCH if the transport block is decoded correctly and may send nothing otherwise. The UE also estimates the received signal quality and sends CQI along with the ACK/nothing on the HS-DPCCH. The Node B may send a retransmission if nothing is received from the UE and may send a new transmission for another transport block if an ACK is received. The Node B sends retransmissions and new transmissions without any signaling on the HS-SCCH.

Figure 7:
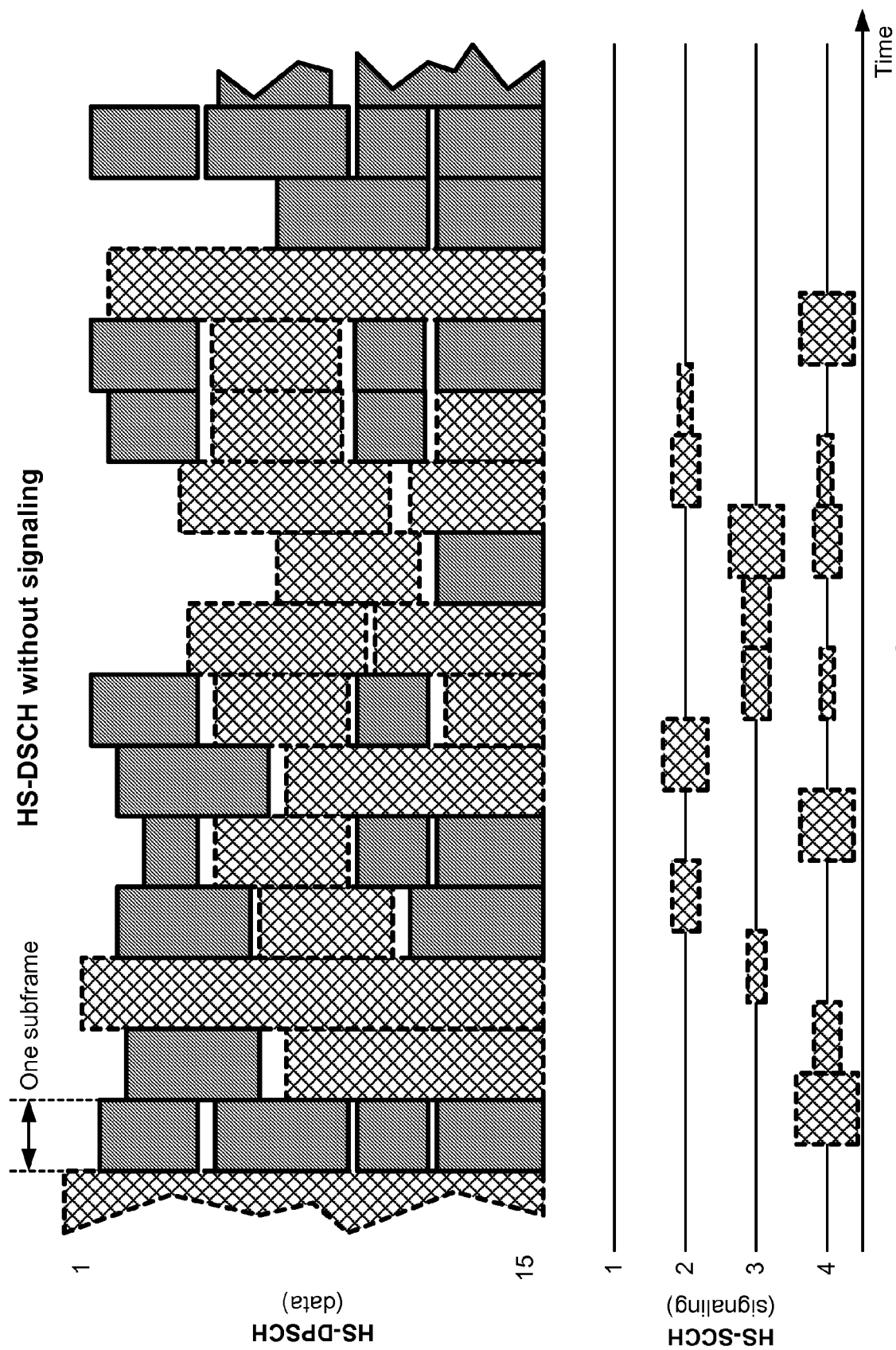
FIG. 7 shows transmissions for multiple UEs with assigned parameters.

FIG. 7 shows data transmission to multiple UEs with assigned parameters. A Node B sends transmissions to UEs with assigned parameters (which are shown with solid shading) as well as transmissions to UEs without assigned parameters (which are shown with diagonal hashing) on the HS-PDSCH. The Node B sends signaling on the HS-SCCH only to the UEs without assigned parameters, which are shown with diagonal hashing. The Node B does not send signaling to the UEs with assigned parameters. As FIGS. 5 and 7 indicate, much radio resources may be saved by not sending signaling to the UEs with assigned parameters.

Figure 8:
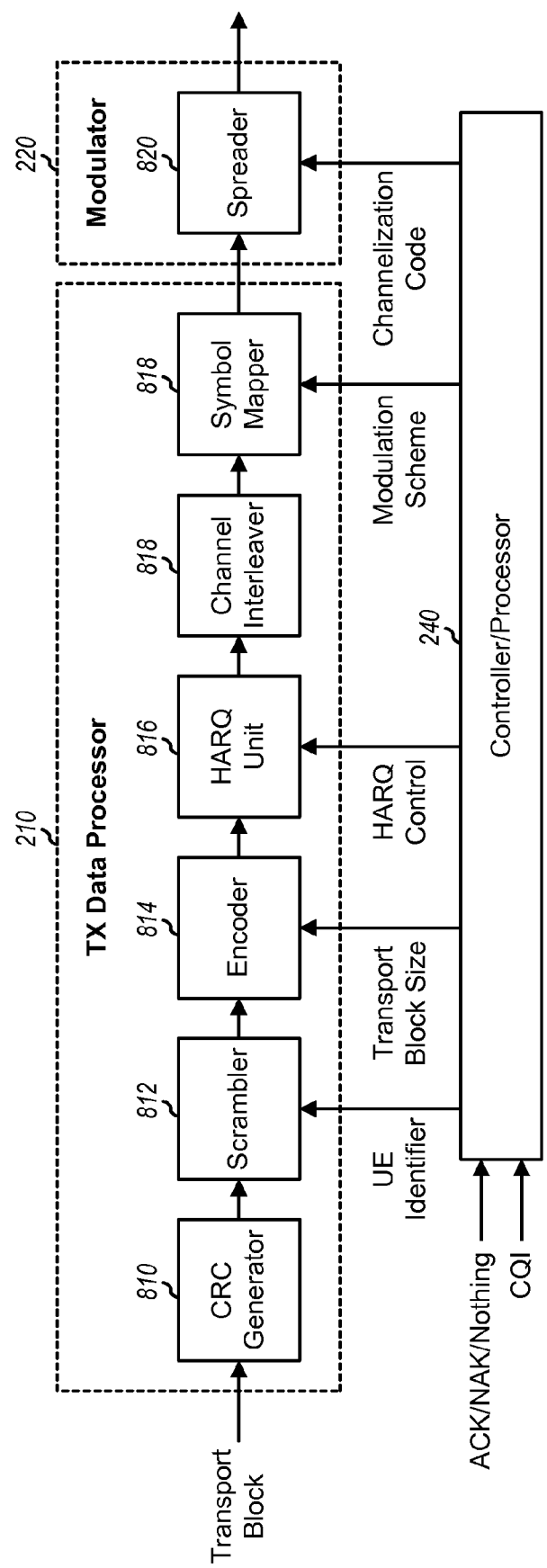
FIG. 8 shows a TX data processor and a modulator at the Node B.

FIG. 8 shows a block diagram of a design of TX data processor 210 and modulator 220 at Node B 110 in FIG. 2. For clarity, FIG. 8 shows processing units to generate a transmission on the HS-PDSCH for one UE.

Within TX data processor 210, a CRC generator 810 generates a CRC for a transport block. A scrambler 812 may scramble the transport block, the CRC, or both the transport block and CRC based on a UE identifier (UE ID) for the recipient UE. This UE ID may be a MAC ID or some other type of ID that can uniquely identify the recipient UE. A UE-specific CRC may be generated in various manners that make this CRC specific for the recipient UE. For example, a CRC may be generated in the normal manner, and the CRC may then be made specific to the UE. This may be achieved by performing an exclusive OR (XOR) operation between the computed CRC and the UE ID. In general, UE-specific scrambling may be performed on all or any portion of a transmission and also anywhere along the transmit processing path.

An encoder 814 encodes the scrambled block based on a coding scheme and provides a coded block having a selected transport block size. Controller 240 may select the transport block size based on the CQI received from the UE, the transport block sizes assigned to the UE, etc. An HARQ unit 816 partitions the coded block into multiple redundancy versions. For each transmission, HARQ unit 816 determines which redundancy version to send based on an HARQ control from controller 240 and provides the selected redundancy version. A channel interleaver 818 interleaves (or reorders) the code bits in the selected redundancy version. A symbol mapper 820 maps the interleaved bits to data symbols based on a modulation scheme selected for the UE. This modulation scheme may be fixed (e.g., to QPSK) when using assigned parameters.

Within modulator 220, a spreader 820 spreads the data symbols based on a channelization code assigned to the UE and provides data chips. The data chips are further processed and transmitted to the UE. Controller/processor 240 may receive feedback (e.g., ACK/NAK/nothing, CQI, etc.) from the UE and may provide various parameters (e.g., the UE ID, transport block size, HARQ control, modulation scheme, channelization code, etc.) for each transmission sent to the UE.

Figure 9:
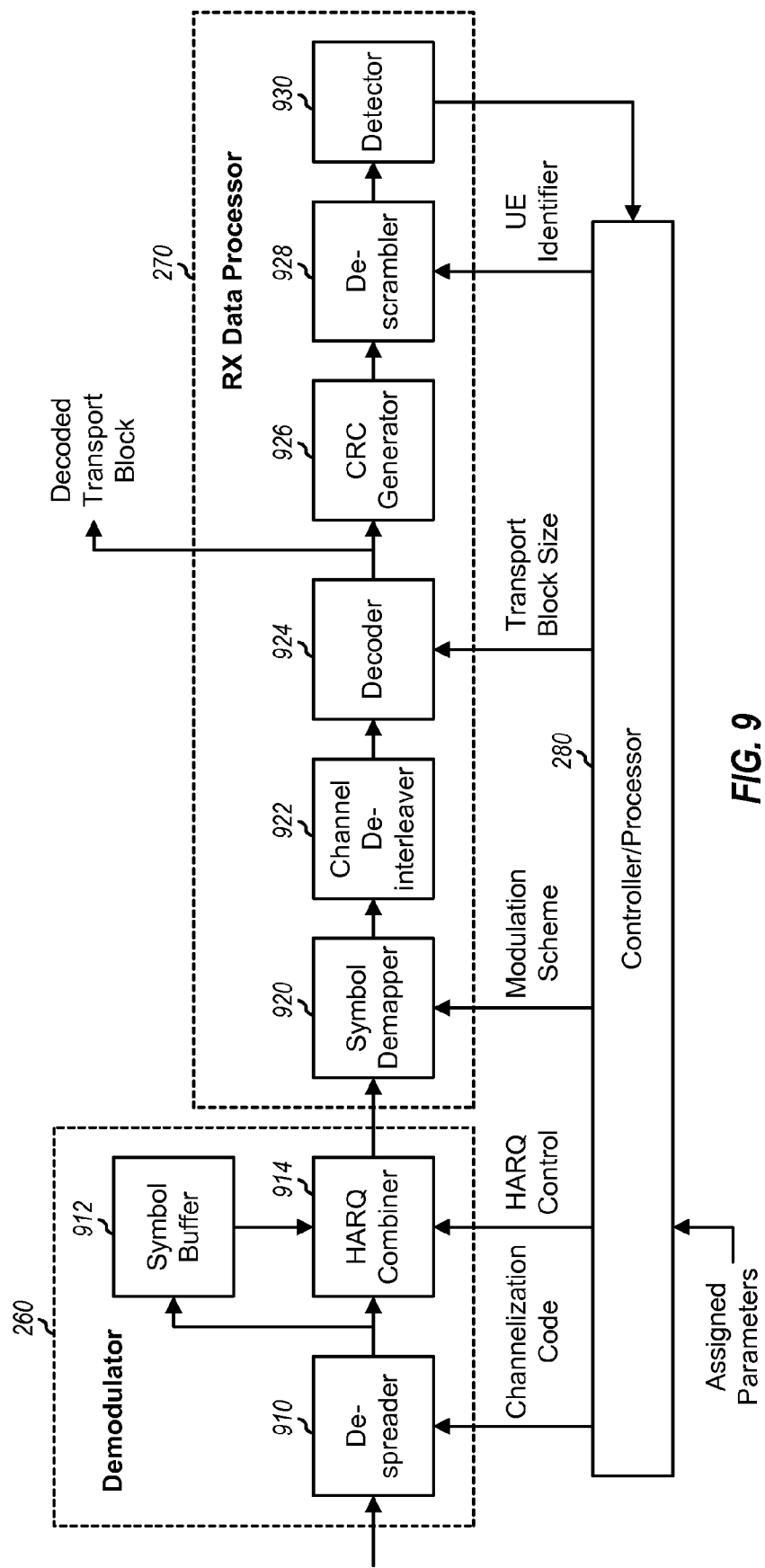
FIG. 9 shows a demodulator and an RX data processor at the UE.

FIG. 9 shows a block diagram of a design of demodulator 260 and RX data processor 270 at UE 120 in FIG. 2. Within demodulator 260, a despreader 910 despreads the received samples for a received transmission based on a channelization code assigned to the UE and provides despread symbols to a symbol buffer 912 and an HARQ combiner 914. Buffer 912 stores the despread symbols for possible combining with future transmissions. HARQ combiner 914 may (a) pass the despread symbols for the current transmission from despreader 910 without combining or (b) combine the despread symbols for the current transmission with despread symbols for one or more prior transmissions based on an HARQ control from controller 280.

Within RX data processor 270, a symbol demapper 920 demaps the despread symbols from HARQ combiner 914 based on the selected modulation scheme. For example, symbol demapper 920 may provide log-likelihood ratios (LLRs) for code bits of the despread symbols. A channel de-interleaver 922 performs de-interleaving in a manner complementary to the interleaving performed by channel interleaver 818 in FIG. 8. A decoder 924 decodes the output of de-interleaver 922 based on a transport block size and provides a decoded transport block.

If the Node B scrambles the CRC for the transport block, then a CRC generator 926 generates a CRC for the decoded transport block, and a descrambler 928 descrambles a received CRC, as shown in FIG. 9. If the Node B scrambles the transport block, then descrambler 928 descrambles the decoded transport block, and CRC generator 926 generates a CRC for the descrambled transport block (not shown in FIG. 9). In either case, a detector 930 compares the locally-generated CRC against the received or descrambled CRC and determines whether the transport block is decoded correctly or incorrectly based on the comparison result. In general, the UE-specific descrambling at the UE is performed in a manner complementary to the UE-specific scrambling at the Node B. Controller/processor 280 may provide various parameters (e.g., the channelization code, HARQ control, modulation scheme, transport block size, UE ID, etc.) for each transmission processed by the UE.

The UE may perform blind decoding for a received transmission based on the assigned parameters. The UE may process the received transmission for each possible hypothesis until the transport block is decoded correctly or all hypotheses have been evaluated. The number of hypotheses is dependent on the unknown factors at the UE. For example, if two transport block sizes can be used for a transmission, then the UE may decode the received transmission for each of the two transport block sizes. Furthermore, if up to two retransmissions can be sent for a transport block and if the UE does not have HARQ information, then the UE may process the received transmission for three hypotheses corresponding to the received transmission being a first transmission, a second transmission, and a third transmission. In this example, the UE may perform blind decoding for up to six hypotheses covering two possible transport block sizes and three transmission possibilities.

The UE may evaluate the hypotheses in a sequential order that may be selected based on the likelihood of occurrence for each hypothesis. For example, the UE may process the received transmission as a new transmission if the prior transmission was decoded correctly and as a retransmission if the prior transmission was decoded in error. The UE may also perform decoding for the transport block size that is most likely, then decoding for the next most likely transport block size, etc. For example, if the UE is assigned two transport block sizes and the larger transport block size is used more often than the smaller transport block size, then the UE may perform decoding for the larger transport block size first before performing decoding for the smaller transport block size.

FIG. 10 shows a process 1000 performed by a Node B for data transmission without signaling. The Node B assigns at least one parameter to a UE (block 1012). The at least one parameter may comprise at least one of a channelization code, a block size, a modulation scheme, a transmission format, a retransmission parameter, a time interval, etc. For example, the at least one parameter may comprise multiple transmission formats (e.g., multiple transport block sizes) usable for transmissions to the UE. The at least one parameter may be assigned during call setup at the start of a call to set up radio bearers for the UE, during reconfiguration to change radio bearers for the UE, etc. The Node B sends the at least one assigned parameter to the UE (block 1014). The Node B thereafter processes a transmission for the UE based on the at least one assigned parameter (block 1016). The Node B may scramble all or a portion of the transmission with an identifier for the UE. The Node B sends the transmission on a data channel shared by a plurality of UEs for processing by the UE based on the at least one assigned parameter (block 1018). The Node B may send the transmission in a time interval assigned to the UE. The Node B may disable transmission of downlink control information/signaling corresponding to the transmission on the shared data channel.

FIG. 11 shows a process 1100 performed by a UE for data reception without signaling. The UE receives at least one parameter assigned to the UE, e.g., during call setup, reconfiguration, etc. (block 1112). The at least one parameter may comprise any of the parameters listed above. The UE thereafter receives a transmission on a data channel shared by a plurality of UEs (block 1114). The UE processes the received transmission based on the at least one parameter assigned to the UE prior to receiving the transmission (block 1116). The received transmission may comprise one or more packets of data (or transport blocks).

The processing by the UE in block 1116 may include processing/decoding the received transmission based on different transmission formats (e.g., different transport block sizes) usable for the received transmission. The UE may select one transmission format at a time, process the received transmission based on the selected transmission format, terminate the processing of the received transmission if it is decoded correctly, and repeat the processing for another transmission format if it is not decoded correctly.

If HARQ is used, then the UE may determine whether the received transmission is a new transmission or a retransmission, e.g., based on decoding result for a prior transmission, the amount of time between the received transmission and a prior transmission, the number of retransmissions allowed, etc. The UE may first process the received transmission as a new transmission to obtain a decoded packet and, if the decoded packet is in error, process the received transmission as a retransmission. Alternatively, the UE may first process the received transmission as a retransmission to obtain a decoded packet and, if the decoded packet is in error, process the received transmission as a new transmission. In both cases, the UE may process the received transmission for different hypotheses corresponding to different numbers of transmission sent prior to the received transmission, different transport block sizes, etc.

The processing in block 1116 may also include determining if the UE is an intended recipient of the received transmission. This determination may be achieved by checking the received transmission with an identifier for the UE, e.g., generating a CRC for the received transmission, descrambling a received CRC with the UE identifier, and comparing the descrambled CRC and the locally-generated CRC. This determination may also be achieved by descrambling the received transmission with the UE identifier.

The UE may receive additional transmissions on the shared data channel and may process each additional received transmission in similar manner based on the at least one parameter assigned to the UE. The UE may discontinuously receive transmissions on the shared data channel.

2. Transmissions with Assigned Time Intervals

In an aspect, a Node B sends transmissions on a shared data channel (e.g., the HS-DSCH) to a UE in time intervals assigned to the UE prior to the transmissions. The Node B may send data to the UE in the assigned time intervals and not in non-assigned time intervals. In this case, the UE may process the shared data channel during the assigned time intervals and may go to sleep at other times.

In an aspect, the time intervals assigned to a UE are determined based on a pattern. This pattern may also be referred to as a discontinuous reception (DRX) pattern, a repetitive pattern, etc. The pattern spans a predetermined time duration of N time intervals, where in general N>1. A time interval may correspond to a TTI, a subframe, or some other unit of time. The pattern includes one or more specific time intervals that may be individually selected from among the N time intervals spanned by the pattern. Hence, any one of the N time intervals may be selected and included in the pattern. The pattern starts at a specific time instant (e.g., the start of the radio frame with SFN=0) and may continually/perpetually repeat.

In general, patterns of the same or different durations/lengths may be assigned to different UEs. Patterns containing different time intervals may be assigned to different UEs in order to evenly distribute the UEs across all of the time intervals available for data transmission. The pattern and the specific time intervals to assign to a UE may be determined based on the type of call, data requirements, system loading, etc. For example, the assigned time intervals for a VoIP call may be spaced apart by 10 or 20 ms. Also, more time intervals may be assigned for potentially more data, and fewer time intervals may be assigned for potentially greater UE battery power saving. The pattern for a UE may be determined at call setup and sent to the UE via upper layer signaling or some other means. The pattern for the UE may also be changed during the call and sent via reconfiguration messages or some other means.

Figure 12:
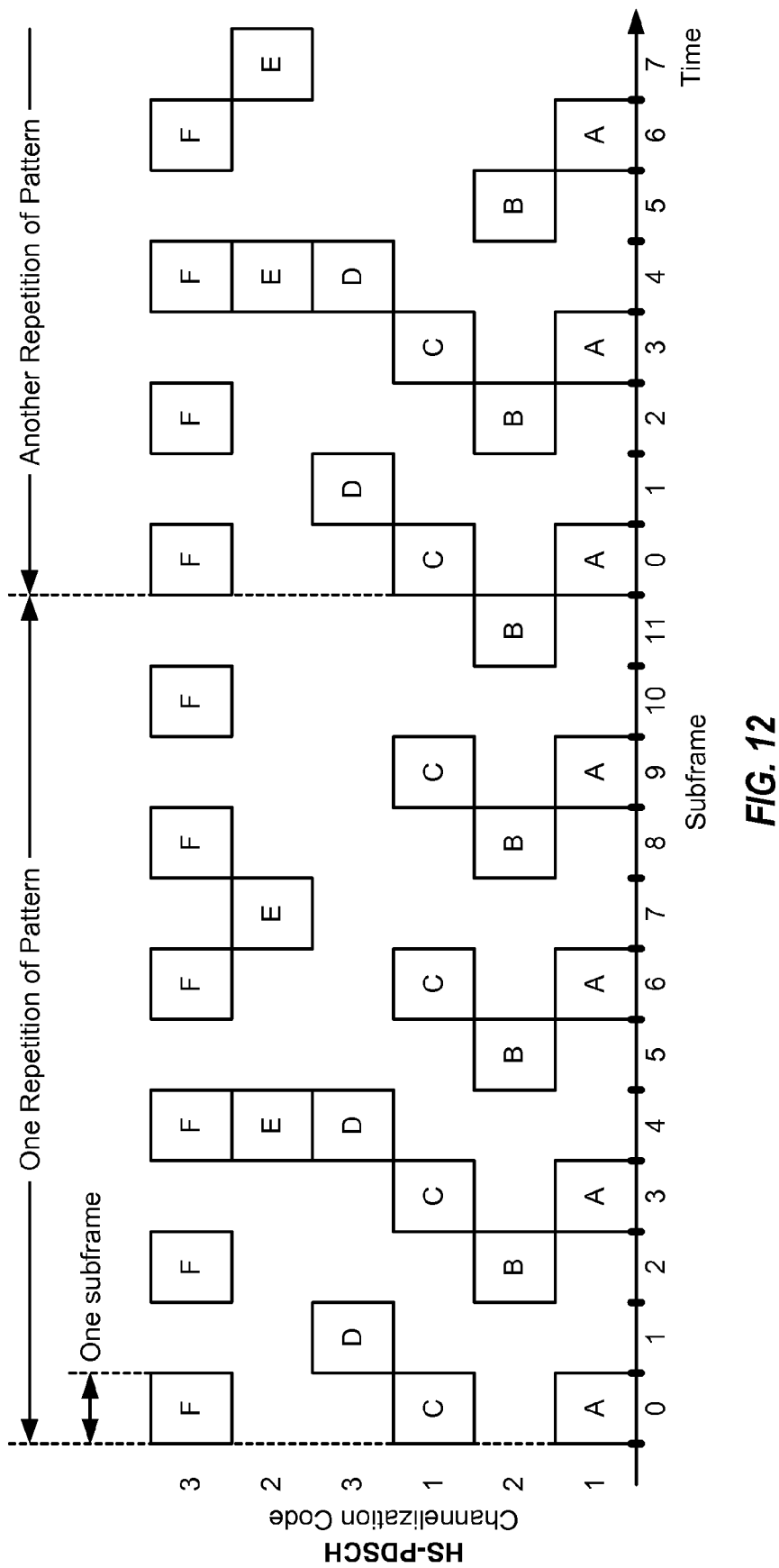
FIG. 12 shows example patterns of assigned time intervals for six UEs.

FIG. 12 shows example patterns for six UEs A through F. In this example, the patterns for the UEs have the same length of 12 subframes or TTIs, which are given indices of 0 through 11. Each subframe corresponds to one time interval. The patterns for UEs A and C include subframes 0, 3, 6 and 9, the pattern for UE B includes subframes 2, 5, 8 and 11, the pattern for UE D includes subframes 1 and 4, the pattern for UE E includes subframes 4 and 7, and the pattern for UE F includes subframes 0, 2, 4, 6, 8 and 10. The patterns repeat every 24 ms, and one repetition of the patterns spans 24 ms.

In the example shown in FIG. 12, UEs A and C are assigned channelization code 1 for the HS-PDSCH, UEs B and E are assigned channelization code 2, and UEs D and F are assigned channelization code 3. A transmission may be sent to UE x, for x∈{A, B, . . . , F}, in one of the squares marked 'x' and using the channelization code assigned to UE x.

A UE may discontinuously monitor the HS-DSCH for possible transmissions to the UE based on the assigned pattern. The UE may operate in a Connected substate in which the UE is only intermittently active but can quickly switch to a fully active substate. In an aspect, the reception of a transmission on the HS-DSCH does not trigger a change out of the Connected substate. A change out of the Connected substate may be achieved, e.g., via an upper layer signaling message. The UE may also discontinuously transmit feedback on the HS-DPCCH according to a discontinuous transmission (DTX) pattern, which may be selected based on the DRX pattern.

Figure 13A:
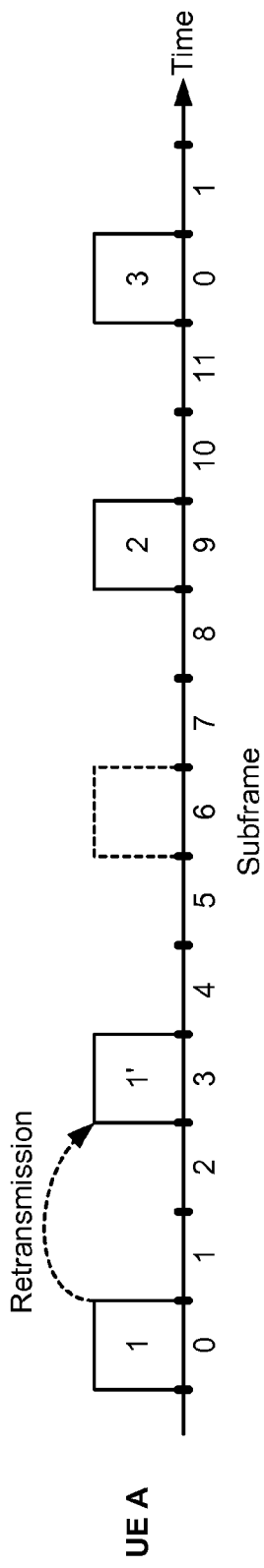
FIGS. 13A, 13B and 13C show example transmissions for three UEs.

FIG. 13A shows example transmissions for UE A using the pattern assigned to this UE in FIG. 12. In this example, transport block 1 is transmitted in subframe 0 and retransmitted in subframe 3. No transmission is sent in subframe 6. Transport block 2 is transmitted in subframe 9 and not retransmitted. Transport block 3 is transmitted in subframe 0 of the next pattern repetition. In each assigned subframe, UE A may blindly decode for a new transmission and/or a retransmission if signaling is not sent on the HS-SCCH.

Figure 13B:
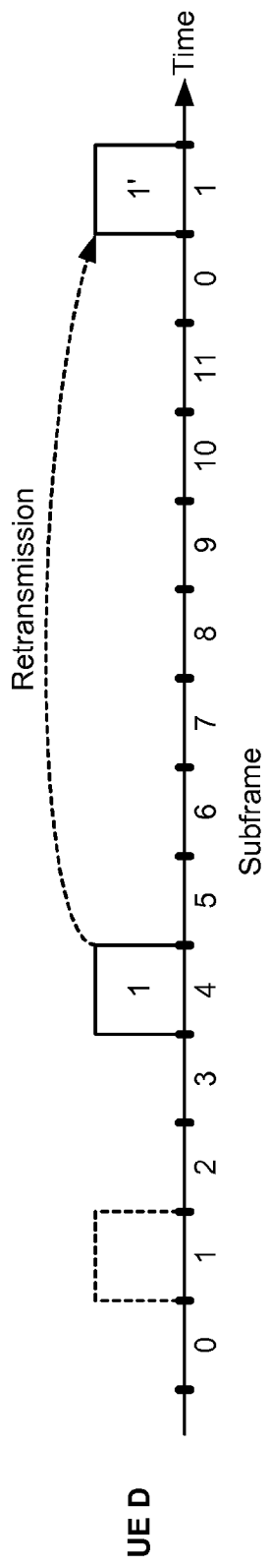

FIG. 13B shows example transmissions for UE D using the pattern assigned to this UE in FIG. 12. In this example, no transmission is sent to UE D in subframe 1. Transport block 1 is transmitted in subframe 4 and retransmitted in subframe 1 of the next pattern repetition.

Figure 13C:
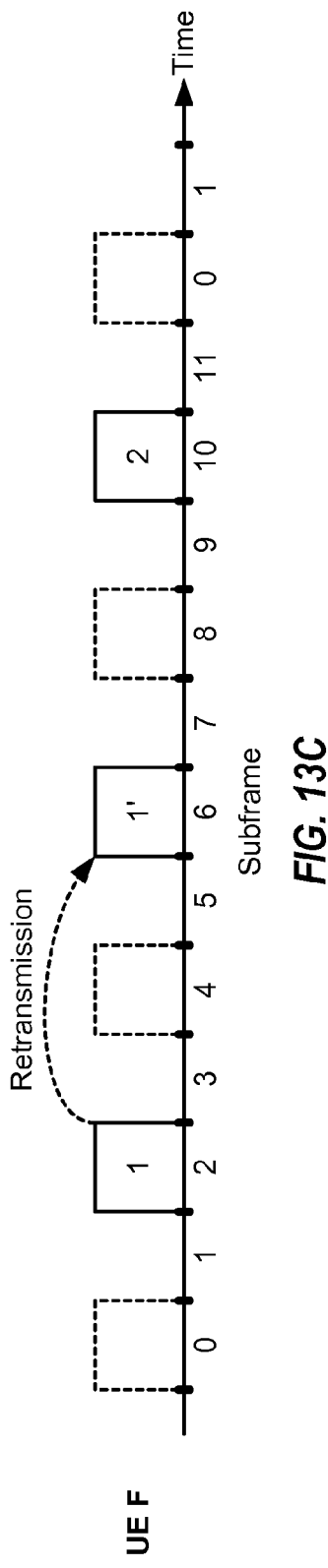

FIG. 13C shows example transmissions for UE F using the pattern assigned to this UE in FIG. 12. In this example, a retransmission can only be sent at least two subframes after the end of a prior transmission. No transmission is sent to UE F in subframe 0. Transport block 1 is transmitted in subframe 2, not retransmitted in subframe 4 because it is less than two subframes from the prior transmission in subframe 2, and retransmitted in subframe 6 instead. No transmission is sent to UE F in subframe 8. Transport block 2 is transmitted in subframe 10 and not retransmitted.

Multiple UEs may be assigned the same time intervals as well as the same channelization code. For example, UEs A and C in FIG. 12 are assigned the same subframes and channelization code 1. In this case, a transmission may be sent to one UE in a time interval and with a channelization code that are also assigned to another UE. Each UE may check a UE-specific CRC for the transmission to determine whether the transmission is intended for that UE. Each UE may store the received samples for its assigned time intervals for possible HARQ combining with a future transmission. Each UE may attempt to recover a transmission in a given time interval by evaluating different hypotheses, e.g., one hypothesis for the current transmission being a first transmission (with no HARQ combining), another hypothesis for the current transmission being a second transmission (and thus combined with one past transmission), another hypothesis for the current transmission being a third transmission (and thus combined with two past transmissions), etc.

In the example shown in FIG. 12, each UE is assigned one channelization code for the HS-PDSCH. In general, a UE may be assigned any number of channelization codes and any one of the channelization codes available for the HS-PDSCH. In an aspect, the same channelization code(s) are assigned and used for all time intervals assigned to a UE, e.g., as shown in FIG. 12. In another aspect, different channelization codes may be assigned for use in different time intervals. For example, UE F may be assigned channelization code 1 in subframe 4 in order to avoid collision with UE D in the code domain for this subframe. A UE may be assigned channelization code independently for each subframe included in the pattern for that UE.

In an aspect, transmissions are sent to a UE in its assigned time intervals with signaling sent on the HS-SCCH. The UE may process the HS-SCCH in an assigned time interval and determine whether any transmission is sent on the HS-PDSCH to the UE. If the signaling indicates a transmission for the UE, then the UE may process the HS-PDSCH based on the signaling received from the HS-SCCH. Otherwise, if the signaling indicates no transmission for the UE, then the UE may go back to sleep without processing the HS-PDSCH.

In another aspect, transmissions are sent to a UE in its assigned time intervals without signaling on the HS-SCCH. In this case, a Node B may send a transmission to the UE in an assigned time interval using parameters assigned to the UE, as described above. The UE may perform blind decoding of the HS-PDSCH in each assigned time interval based on the assigned parameters, as also described above.

In an aspect, HARQ combining is allowed across different repetitions of the pattern, e.g., as shown in FIG. 13B. In another aspect, HARQ combining is not allowed across different repetitions of the pattern. For example, a transmission in subframe 10 of the first pattern repetition in FIG. 12 for UE F is not combined with a transmission in subframe 0 of the next pattern repetition. This HARQ constraint restricts all transmissions of a transport block to within one repetition of the pattern, so that a new transmission and a retransmission are not sent in different repetitions of the pattern. This HARQ constraint may reduce decoding complexity since a UE may use the start of the pattern as a synchronization mechanism for HARQ. A transport block that is not decoded correctly by the end of one repetition of the pattern may be transmitted anew in the next repetition of the pattern.

FIG. 14 shows a process 1400 performed by a Node B for data transmission with assigned time intervals. The Node B sends an assignment of time intervals usable for data transmission to a UE, which may be given by a pattern of individually selected time intervals (block 1412). The assigned time intervals may be used for transmission and retransmissions of a packet of data (or transport block) to the UE. The assigned time intervals for this UE may also be assigned to other UEs so that, in a given time interval, a transmission may be sent to any one of the UEs assigned with this time interval. The Node B sends a transmission to the UE in a time interval assigned to the UE on a data channel (e.g., the HS-DSCH and HS-PDSCH) shared by a plurality of UEs (block 1414).

FIG. 15 shows a process 1500 performed by a UE for data reception with assigned time intervals. The UE receives an assignment of time intervals usable for data transmission to the UE, which may be given by a pattern of individually selected time intervals (block 1512). The UE receives a transmission on a data channel shared by a plurality of UEs in a time interval assigned to the UE and determined based on the pattern (block 1514). The UE processes the received transmission and attempts to recover data sent in the transmission (block 1516). For example, the UE may process the received transmission based on a plurality of transmission formats usable for the time interval, despread the received transmission with a channelization code for the assigned time interval, etc. The UE may also determine whether the data recovered from the received transmission is intended for the UE, e.g., by descrambling the data and/or a received CRC with an identifier for the UE. The UE may monitor the shared data channel during the assigned time intervals and may skip monitoring of the shared data channel during remaining times.

3. Transmissions with Assigned Parameters and Time Intervals

In general, a Node B may send transmissions to a UE in various manners. Table 3 lists some configurations for sending transmissions to a UE. Other configurations may also be defined.

TABLE 3

| Configuration | Allowed Parameters | For Transmissions in . . . | HS-SCCH Signaling |
|---|---|---|---|
| 1 | Any parameters | Any subframes | Yes |
| 2 | Assigned parameters | Assigned subframes | No |
| 3 | Assigned parameters | Any subframes | No |
| 4 | Assigned parameters Non-assigned parameters | Assigned subframes Assigned subframes | No Yes |

TABLE 3-continued

| Configuration | Allowed Parameters | For Transmissions in . . . | HS-SCCH Signaling |
|---|---|---|---|
| 5 | Assigned parameters Any parameters | Assigned subframes Non-assigned subframes | No Yes |
| 6 | Assigned parameters Non-assigned parameters | Any subframes Any subframes | No Yes |

In configuration 1, the Node B may send transmissions to the UE in any subframe using any parameters and would send signaling on the HS-SCCH prior to each transmission, as currently performed in HSDPA. In configuration 2, the Node B may send transmissions to the UE only in subframes assigned to the UE and using only the assigned parameters. The Node B does not send any signaling on the HS-SCCH. In this configuration, the UE may process the HS-PDSCH only in the assigned subframes based on the assigned parameters and may sleep in other subframes. In configuration 3, the Node B may send transmissions to the UE in any subframe using the assigned parameters and would send no signaling. The UE may process the HS-PDSCH in each subframe based on the assigned parameters.

In configuration 4, the Node B may send transmissions to the UE only in assigned subframes. The Node B may use the assigned parameters and would then send no signaling. The Node B may also use non-assigned parameters and would then send signaling on the HS-SCCH. In configuration 5, the Node B may send transmissions to the UE in assigned subframes using the assigned parameters and may send transmissions in other subframes using any parameters. In this configuration, the Node B may send signaling on the HS-SCCH when (a) sending transmissions in the non-assigned subframes, as indicated in Table 3, or (b) using non-assigned parameters. In configuration 6, the Node B may send transmissions in any subframes using assigned or non-assigned parameters and would send signaling when using non-assigned parameters. Configurations 4, 5 and 6 support use of assigned and non-assigned parameters for transmissions to the UE. The non-assigned parameters are restricted to assigned subframes in configuration 4, restricted to non-assigned subframes in configuration 5, and not restricted to any subframe in configuration 6. Configurations 4, 5 and 6 allow transmissions to be sent using both existing HS-DSCH format with signaling sent on the HS-SCCH and new HS-DSCH formats without signaling on the HS-SCCH.

In some configurations, such as configurations 4 and 6 in Table 3, a UE may receive a transmission with or without signaling on the HS-SCCH. In this case, the UE may process the HS-SCCH to determine whether signaling has been sent to the UE. If signaling is received on the HS-SCCH, then the UE may process the HS-PDSCH based on the received signaling. If signaling is not received on the HS-SCCH, then the UE may process the HS-PDSCH based on the assigned parameters. The UE may perform blind decoding for the received transmission on the HS-PDSCH as described above when signaling is not received.

FIG. 16 shows a process 1600 performed by a Node B for data transmission with and without signaling. The Node B sends an assignment of at least one parameter to a UE, e.g., during call setup or reconfiguration (block 1612). The Node B sends to a UE a transmission based on at least one parameter selected for the transmission (block 1614). The Node B may send the transmission on a shared data channel. The Node B sends signaling comprising the at least one selected parameter to the UE if the at least one selected parameter is not among the at least one assigned parameter (block 1616). The Node B sends no signaling for the transmission if the at least one selected parameter is among the at least one assigned parameter (block 1618).

The Node B may select at least one parameter for each transmission sent to the UE and may send signaling only for transmissions sent with parameters not among the at least one assigned parameter. For configurations 4 and 5 in Table 3, the Node B uses only the at least one assigned parameter for transmissions sent during time intervals assigned to the UE. For configuration 6, the Node B may use assigned or non-assigned parameters for each transmission to the UE.

FIG. 17 shows a process 1700 performed by a UE for data reception with and without signaling. The UE receives an assignment of at least one parameter, e.g., during call setup or reconfiguration (block 1712). The UE decodes signaling on a control channel, e.g., the HS-SCCH (block 1714). The UE processes a transmission on a data channel (e.g., the HS-DSCH and HS-PDSCH) based on at least one parameter obtained from the signaling if the signaling is decoded successfully (block 1716). The UE processes the transmission based on the at least one assigned parameter if the signaling is not successfully decoded (block 1718).

For block 1718, the UE may first process the transmission based on a first set of at least one assigned parameter (e.g., a first transmission format) and, if the transmission is not successfully decoded, then process the transmission based on a second set of at least one assigned parameter (e.g., a second transmission format). For HARQ, the UE may first process the transmission as a new transmission and, if the transmission is not successfully decoded, then process the transmission as a retransmission. When processing as a retransmission, the UE may combine the transmission with a stored transmission to obtain a combined transmission and then process the combined transmission based on the at least one assigned parameter. The UE may also store the transmission for future combining if the transmission is not successfully decoded.

The techniques described herein may be used to efficiently support real-time services (e.g., VoIP, video, gaming, etc.) as well as bursty services. The techniques allow a shared data channel to efficiently support services that send small packets frequently on the downlink as well as other services that may send bursts of data. The techniques are especially advantageous for asymmetric applications in which more data is sent on the downlink than uplink. These asymmetric applications may include gaming, real-time streaming video, real-time streaming audio, interactive multimedia queries, broadcast, etc. The techniques may improve system capacity and consequently latency of real-time services. Lower latency on the downlink may (a) improve user experience, which may be sensitive to overall round-trip delay, and/or (b) allow for more latency on the uplink for a given round-tip delay, which may potentially increase uplink capacity. The techniques may also allow a network operator to mix real-time services (e.g., VoIP) and other services more smoothly.

The techniques may be used for HSDPA, as described above. The new HS-DSCH formats with assigned parameters do not require signaling on the associated HS-SCCH and are backward compatible with HSDPA Release 5. The new HS-DSCH formats may be used (a) only in assigned subframes to allow for DRX operation by the UEs or (b) in any subframe to provide flexibility.

The techniques described herein may be used in CDMA systems, as described above. The techniques may also be used in other multiple-access systems in which system resources are shared among users. For example, the techniques may be used in OFDMA systems where transmit power and subcarriers (or tones) are system resources that may be shared, in TDMA systems where time slots are system resources that may be shared, etc. An OFDMA system may define hop ports that may be mapped to different subcarriers in a pseudo-random or deterministic manner across time. The subcarriers, hop ports, and time slots may be shared in similar manner as channelization codes in CDMA systems. The description above may be applied to OFDMA and TDMA systems in analogous manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method comprising:
    receiving at a user equipment configured to receive control information over a control channel, at least one parameter assigned to the user equipment;
    receiving at the user equipment, in one of a plurality of time intervals assigned to the user equipment, a transmission on a data channel shared by a plurality of user equipments;
    processing the received transmission to obtain a decoded packet based on the assigned at least one parameter received by the user equipment prior to receiving the transmission; and
    when the decoded packet is in error:
        processing the received transmission as a retransmission if the decoded packet was obtained by processing the received transmission as a new transmission; and
        processing the received transmission as a new transmission if the decoded packet was obtained by processing the received transmission as a retransmission,
    wherein no signaling about the transmission is received by the user equipment over the control channel after the assigned at least one parameter is received by the user equipment.

2. The method of claim 1, the at least one parameter comprising:
    at least one of a channelization code, a transmission format, a block size, a modulation scheme, and a retransmission parameter.

3. The method of claim 1, the at least one parameter comprising;
    a plurality of transmission formats usable for transmissions to the user equipment.

4. The method of claim 1, the processing comprising:
    determining if the user equipment is an intended recipient of the received transmission.

5. The method of claim 4, the determining comprising:
    checking the received transmission with an identifier for the user equipment.

6. The method of claim 5, the checking comprising:
    descrambling a cyclic redundancy check (CRC) for the received transmission with the identifier for the user equipment.

7. The method of claim 4, the determining comprising:
    descrambling the received transmission with the identifier for the user equipment.

8. The method of claim 1, the processing comprising:
    determining if the received transmission is a new transmission or a retransmission.

9. The method of claim 8, the determining is based on at least one of a decoding result for a prior transmission, an amount of time between the received transmission and a prior transmission, and a number of retransmissions allowed.

10. A method comprising:
    receiving at a user equipment configured to receive control information over a control channel, at least one parameter assigned to the user equipment;
    receiving at the user equipment a transmission on a data channel shared by a plurality of user equipments; and
    processing the received transmission based on the assigned at least one parameter received by the user equipment prior to receiving the transmission and wherein no signaling about the transmission is received by the user equipment over the control channel after the assigned at least one parameter is received by the user equipment, wherein the processing comprises processing the received transmission as a new transmission to obtain a decoded packet, and if the decoded packet is in error, processing the received transmission as a retransmission.

11. A method comprising:
    receiving at a user equipment configured to receive control information over a control channel, at least one parameter assigned to the user equipment;
    receiving at the user equipment a transmission on a data channel shared by a plurality of user equipments; and
    processing the received transmission based on the assigned at least one parameter received by the user equipment prior to receiving the transmission and wherein no signaling about the transmission is received by the user equipment over the control channel after the assigned at least one parameter is received by the user equipment, wherein the processing comprises processing the received transmission as a retransmission to obtain a decoded packet, and if the decoded packet is in error, processing the received transmission as a new transmission.

12. The method of claim 1, the received transmission comprising;
    at least one packet of data.

13. The method of claim 1, the processing is performed without using downlink control information.

14. The method of claim 1, the processing comprising:
    decoding the received transmission based on a plurality of transmission formats usable for the received transmission.

15. The method of claim 1, the processing comprising:
    despreading the received transmission with a channelization code that is longer than a shortest channelization code for the data channel.

16. The method of claim 1, the receiving comprising:
    discontinuously receiving transmissions on the data channel.

17. The method of claim 1, further comprising:
    receiving at least one additional transmission on the data channel; and
    processing the at least one additional received transmission by the user equipment based on the at least one parameter.

18. The method of claim 1, further comprising:
    receiving the at least one parameter during call setup or reconfiguration.

19. A user equipment comprising:
    means for receiving at a user equipment configured to receive control information over a control channel, at least one parameter assigned to the user equipment;
    means for receiving a transmission, in one of a plurality of time intervals assigned to the user equipment, on a data channel shared by a plurality of user equipments; and means for processing the received transmission based on the assigned at least one parameter received by the user equipment prior to receiving the transmission,
wherein no signaling about the transmission is received by the user equipment over the control channel after the assigned at least one parameter is received by the user equipment,
wherein the means for processing the received transmission reprocesses the received transmission as a retransmission if the decoded packet is in error and was obtained by processing the received transmission as a new transmission, and
wherein the means for processing the received transmission reprocesses the received transmission as a new transmission if the decoded packet is in error and was obtained by processing the received transmission as a retransmission.

20. The user equipment of claim 19, further comprising:
means for receiving at least one additional transmission on the data channel; and
means for processing the at least one additional received transmission based on the at least one parameter.

21. A method comprising:
receiving at a user equipment configured to receive control information over a control channel, at least one parameter assigned to the user equipment;
receiving a plurality of transmissions on a data channel in time intervals assigned to the user equipment;
processing the plurality of received transmissions based on the assigned at least one parameter assigned to the user equipment; and
when the decoded packet is in error:
processing the received transmission as a retransmission if the decoded packet was obtained by processing the received transmission as a new transmission; and
processing the received transmission as a new transmission if the decoded packet was obtained by processing the received transmission as a retransmission,
wherein no signaling about the transmissions are received by the user equipment over the control channel after the assigned at least one parameter is received by the user equipment.

22. The method of claim 21, further comprising:
receiving the time intervals and the at least one parameter assigned to the user equipment during call setup or reconfiguration.

23. A method comprising:
assigning at least one parameter to a user equipment configured to receive control information over a control channel, the at least one parameter comprising a plurality of time intervals corresponding to the user equipment; and
sending a transmission on a data channel shared by a plurality of user equipments for processing by the user equipment based on the at least one assigned parameter wherein no signaling about the transmission is sent over the control channel after the at least one parameter is assigned to the user equipment,
wherein the transmission is processed as both a new transmission and a retransmission if a decoded packet obtained from a first processing of the transmission is in error.

24. The method of claim 23, the assigning at least one parameter comprising:
assigning a plurality of transmission formats to the user equipment.

25. The method of claim 23, further comprising:
scrambling at least a portion of the transmission with an identifier for the user equipment.

26. The method of claim 23, the sending comprising:
sending the transmission on the data channel in a time interval assigned to the user equipment.

27. The method of claim 23, further comprising:
sending no signaling on the control channel for the transmission on the data channel.

28. A base station in a wireless communication system, comprising:
a processor configured to:
assign at least one parameter to a user equipment configured to receive control information over a control channel,
send a transmission on a data channel shared by a plurality of user equipments for processing by the user equipment based on the at least one assigned parameter wherein no signaling is sent on the control channel for the transmission sent on the data channel after the at least one parameter is assigned to the user equipment, and
assign a plurality of time intervals to the user equipment; and
a memory coupled to the processor,
wherein the transmission is processed as both a new transmission and a retransmission if a decoded packet obtained from a first processing of the transmission is in error.

29. The base station of claim 28, the at least one parameter comprising:
a transmission format, and the processor to specify the transmission format to the user equipment.

30. A method comprising:
receiving at a user equipment configured to receive control information over a control channel, at least one time interval assigned to the user equipment;
receiving a transmission on a data channel shared by a plurality of user equipments in one of a plurality of time intervals assigned to the user equipment, wherein the plurality of time intervals is determined based on a pattern of individually selected time intervals usable for data transmission to the user equipment; and
processing the received transmission by the user equipment without receiving control information about the transmission over the control channel after the assigned at least one time interval is received by the user equipment,
wherein the user equipment processes the transmission as both a new transmission and a retransmission if a decoded packet obtained from a first processing of the transmission by the user equipment is in error.

31. The method of claim 30, the individually selected time intervals in the pattern are usable for transmission and retransmission of a packet of data.

32. The method of claim 30, the plurality of time intervals assigned to the user equipment is assignable to other user equipments.

33. The method of claim 30, the processing comprising:
processing the received transmission based on a plurality of transmission formats usable for the one time interval.

34. The method of claim 30, the processing comprising:
determining whether data recovered from the received transmission is intended for the user equipment.

35. The method of claim 30, the processing comprising:
descrambling at least a portion of the received transmission with an identifier for the user equipment.

36. The method of claim 30, the processing comprising:
despreading the received transmission with a channelization code for the assigned plurality of time intervals.

37. The method of claim 30, further comprising:
monitoring the data channel during time intervals assigned to the user equipment and determined based on the pattern; and
not monitoring the data channel during remaining times.

38. The method of claim 30, wherein a transmission and a retransmission are not sent in different repetitions of the pattern.

39. A method comprising:
receiving at a user equipment configured to receive control information over a control channel, a plurality of time intervals assigned to the user equipment;
receiving a plurality of transmissions on a data channel shared by a plurality of user equipments in the plurality of time intervals assigned to the user equipment, the plurality of time intervals determined based on a pattern of individually selected time intervals wherein no control information about the plurality of transmission is received over the control channel after the plurality of time intervals is assigned to the user equipment; and
processing the plurality of transmissions by the user equipment,
wherein the user equipment processes the plurality of transmission as both a new transmission and a retransmission if a decoded packet obtained from a first processing of the plurality of transmissions by the user equipment is in error.

40. A user equipment comprising:
a processor configured to receive a transmission on a data channel shared by a plurality of user equipments in a one of a plurality of time intervals assigned to the user equipment and determined based on a pattern of individually selected time intervals usable for data transmission to the user equipment wherein no control information about the plurality of transmissions is received over the control channel after the plurality of time intervals is assigned to the user equipment and to process the received transmission; and
a memory coupled to the processor,
wherein the processor is further configured to process the transmission as both a new transmission and a retransmission if a first decoded packet obtained from the transmission is in error.

41. A user equipment comprising:
means for receiving at a user equipment configured to receive control information over a control channel, at least one time interval assigned to the user equipment;
means for receiving a transmission on a data channel shared by a plurality of user equipments in a plurality of time intervals assigned to the user equipment, the plurality of time intervals determined based on a pattern of individually selected time intervals usable for data transmission to the user equipment wherein no control information about the plurality of transmission is received over the control channel after the assigned at least one time interval is received by the user equipment; and
means for processing the received transmission,
wherein the means for processing the received transmission processes the transmission as both a new transmission and a retransmission if a first decoded packet obtained from the transmission is in error.

42. A method comprising:
assigning a plurality of time intervals to a user equipment configured to receive control information over a control channel; and
sending a transmission during each of the plurality of time intervals on a data channel shared by a plurality of user equipments for processing by the user equipment wherein no control information about the transmission sent during each of the plurality of time intervals is sent over the control channel after the plurality of time intervals is assigned to the user equipment,
wherein the transmission sent during each of the plurality of time intervals is processed as both a new transmission and a retransmission if a first decoded packet obtained from the transmission sent during each of the plurality of time intervals is in error.

43. A base station in a wireless communication system, comprising:
a processor to assign a plurality of time intervals to a user equipment, the user equipment configured to receive control information over a control channel, and the processor to send a transmission during each of the plurality of time intervals on a data channel shared by a plurality of user equipments for processing by the user equipment wherein no control information about the transmission is sent over the control channel after the plurality of time intervals is assigned to the user equipment; and
a memory coupled to the processor,
wherein the user equipment processes the transmission sent during each of the plurality of time intervals as both a new transmission and a retransmission if a first decoded packet obtained from the transmission sent during each of the plurality of time intervals is in error.

44. A method comprising:
decoding signaling on a control channel to obtain at least one parameter;
processing a transmission received in one of a plurality of time intervals assigned to a user equipment a first time based on at the least one parameter obtained from the signaling if the signaling is decoded successfully wherein no control information about the transmission is received over the control channel; and
processing the transmission a second time based on at least one parameter assigned to a user equipment if the signaling is not successfully decoded wherein no control information about the transmission is received over the control channel after the signaling is decoded,
wherein the transmission is processed the second time as a retransmission if the transmission is processed the first time as a new transmission, and
wherein the transmission is processed the second time as a new transmission if the transmission is processed the first time as a retransmission.

45. A method comprising:
decoding signaling on a control channel to obtain at least one parameter;
processing a transmission based on the at least one parameter obtained from the signaling if the signaling is decoded successfully wherein no control information about the transmission is received over the control channel;
processing the transmission based on at least one parameter assigned to a user equipment if the signaling is not successfully decoded wherein no control information about the transmission is received over the control channel after the signaling is decoded; and processing the transmission based on at least one different parameter assigned to the user equipment if the transmission is not successfully decoded based on the at least one parameter assigned to the user equipment.

46. A method comprising:

decoding signaling on a control channel to obtain at least one parameter;

processing a transmission based on the at least one parameter obtained from the signaling if the signaling is decoded successfully wherein no control information about the transmission is received over the control channel; and processing the transmission based on at least one parameter assigned to a user equipment if the signaling is not successfully decoded wherein no control information about the transmission is received over the control channel after the signaling is decoded, and the processing the transmission based on the at least one parameter assigned to the user equipment comprises processing the transmission as a new transmission, and processing the transmission as a retransmission if the transmission is not successfully decoded as a new transmission.

47. A method comprising:

decoding signaling on a control channel to obtain at least one parameter;

processing a transmission based on the at least one parameter obtained from the signaling if the signaling is decoded successfully wherein no control information about the transmission is received over the control channel;

processing the transmission based on at least one parameter assigned to a user equipment if the signaling is not successfully decoded wherein no control information about the transmission is received over the control channel after the signaling is decoded; and storing the transmission for future combining if the transmission is not successfully decoded.

48. A method comprising:

decoding signaling on a control channel to obtain at least one parameter;

processing a transmission based on the at least one parameter obtained from the signaling if the signaling is decoded successfully wherein no control information about the transmission is received over the control channel; and processing the transmission based on at least one parameter assigned to a user equipment if the signaling is not successfully decoded wherein no control information about the transmission is received over the control channel after the signaling is decoded, wherein the processing the transmission based on the at least one parameter assigned to the user equipment comprises:

combining the transmission with a stored transmission to obtain a combined transmission, and processing the combined transmission based on the at least one parameter assigned to the user equipment.

49. A method comprising:

decoding signaling on a control channel to obtain at least one parameter;

processing a transmission based on the at least one parameter obtained from the signaling if the signaling is decoded successfully wherein no control information about the transmission is received over the control channel;

processing the transmission based on at least one parameter assigned to a user equipment if the signaling is not successfully decoded wherein no control information about the transmission is received over the control channel after the signaling is decoded; and receiving the at least one parameter assigned to the user equipment during call setup or reconfiguration.

50. A user equipment, comprising:

a processing system configured to:

receive control information over a control channel;

receive at least one parameter assigned to the user equipment;

receive in one of a plurality of time intervals assigned to the user equipment, a transmission on a data channel shared by a plurality of user equipments;

process the received transmission to obtain a decoded packet based on the assigned at least one parameter received prior to receiving the transmission; and when the decoded packet is in error:

the processing system processes the received transmission as a retransmission if the decoded packet was obtained by processing the received transmission as a new transmission, and the processing system processes the received transmission as a new transmission if the decoded packet was obtained by processing the received transmission as a retransmission, wherein the processing system does not receive signaling about the transmission over the control channel after the assigned at least one parameter is received.

51. A computer program product for a user equipment, comprising:

a non-transitory computer-readable medium comprising code for:

receiving control information over a control channel;

receiving at least one parameter assigned to the user equipment;

receiving in one of a plurality of time intervals assigned to the user equipment, a transmission on a data channel shared by a plurality of user equipments;

processing the received transmission to obtain a decoded packet based on the assigned at least one parameter received prior to receiving the transmission; and when the decoded packet is in error:

the code for processing processes the received transmission as a retransmission if the decoded packet was obtained by processing the received transmission as a new transmission, and the code for processing processes the received transmission as a new transmission if the decoded packet was obtained by processing the received transmission as a retransmission, wherein the code for receiving control information does not receive signaling about the transmission over the control channel after the assigned at least one parameter is received.

52. A base station, comprising:

means for assigning at least one parameter to a user equipment configured to receive control information over a control channel, the at least one parameter comprising a plurality of time intervals corresponding to the user equipment; and means for sending a transmission on a data channel shared by a plurality of user equipments for processing by the user equipment based on the at least one assigned parameter, wherein no signaling about the transmission is sent over the control channel after the at least one parameter is assigned to the user equipment, and wherein the transmission is processed as both a new transmission and a retransmission if a decoded packet obtained from a first processing of the transmission is in error.

53. A computer program product of a base station, comprising:
- a non-transitory computer-readable medium comprising code for:
- assigning at least one parameter to a user equipment configured to receive control information over a control channel, the at least one parameter comprising a plurality of time intervals corresponding to the user equipment; and
- sending a transmission on a data channel shared by a plurality of user equipments for processing by the user equipment based on the at least one assigned parameter,
- wherein no signaling about the transmission is sent over the control channel after the at least one parameter is assigned to the user equipment, and
- wherein the transmission is processed as both a new transmission and a retransmission if a decoded packet obtained from a first processing of the transmission is in error.

* * * * *